United States Patent
Takatori et al.

(10) Patent No.: US 9,435,514 B2
(45) Date of Patent: Sep. 6, 2016

(54) SURFACE LIGHT SOURCE DEVICE AND DISPLAY DEVICE

(75) Inventors: Hiroshi Takatori, Saitama (JP); Masao Yamaguchi, Saitama (JP)

(73) Assignee: Enplas Corporation, Saitama (JP)

( * ) Notice: Subject to any disclaimer, the term of this patent is extended or adjusted under 35 U.S.C. 154(b) by 185 days.

(21) Appl. No.: 14/347,646

(22) PCT Filed: Sep. 10, 2012

(86) PCT No.: PCT/JP2012/005721
§ 371 (c)(1),
(2), (4) Date: Mar. 27, 2014

(87) PCT Pub. No.: WO2013/046560
PCT Pub. Date: Apr. 4, 2013

(65) Prior Publication Data
US 2014/0233217 A1    Aug. 21, 2014

(30) Foreign Application Priority Data

Sep. 29, 2011    (JP) ................................ 2011-215747

(51) Int. Cl.
| G09F 13/04 | (2006.01) |
| G09F 13/08 | (2006.01) |
| F21V 7/00 | (2006.01) |
| F21V 5/00 | (2015.01) |
| F21V 13/02 | (2006.01) |

(Continued)

(52) U.S. Cl.
CPC .............. *F21V 13/02* (2013.01); *G02B 6/0096* (2013.01); *G02F 1/133602* (2013.01); *G09F 13/04* (2013.01); *G09F 13/0409* (2013.01); *G09F 13/14* (2013.01); *G02B 6/003* (2013.01); *G02B 6/0031* (2013.01); *G02B 6/0053* (2013.01); *G09F 2013/049* (2013.01); *G09F 2013/147* (2013.01)

(58) Field of Classification Search
CPC    G02B 6/0031; G02B 6/0023; G02B 6/0028; G02B 6/003; G02F 1/133615; F21V 13/04; F21V 5/08; F21V 5/04; F21V 5/045; G09F 2013/147

See application file for complete search history.

(56) References Cited

U.S. PATENT DOCUMENTS

2006/0181901 A1* 8/2006 Sakai ................... G02B 6/0096
362/613
2006/0203512 A1* 9/2006 Ko .................... G02F 1/133605
362/609

(Continued)

FOREIGN PATENT DOCUMENTS

| CN | 1836133 A | 9/2006 |
| JP | 2007-087658 A | 4/2007 |
| JP | 2010-108900 A | 5/2010 |

*Primary Examiner* — Jong-Suk (James) Lee
*Assistant Examiner* — Erin Kryukova
(74) *Attorney, Agent, or Firm* — Brundidge & Stanger, P.C.

(57) ABSTRACT

In a surface light source device (1), a positive reflective region (23) of a reflective member (20) that is disposed on the bottom surface (4) of a housing (2) reflects light output by a light emitting device (14) toward a direction away from the light emitting device (14). As a result, the brightness of the light in the proximity of the light emitting device (14) of the surface shaped illuminating light output by a light emitting surface member (3) can be suppressed, and the brightness of light of a central part (position furthest away from the light emitting device (14)) of the surface shaped illuminating light output by the light emitting surface member (3) can be increased.

6 Claims, 57 Drawing Sheets

(51) Int. Cl.
    *G09F 13/14*     (2006.01)
    *G02F 1/1335*     (2006.01)
    *F21V 8/00*     (2006.01)

(56) References Cited

U.S. PATENT DOCUMENTS

| | | | | |
|---|---|---|---|---|
| 2007/0274095 A1* | 11/2007 | Destain | G02B 6/0028 | 362/609 |
| 2010/0142220 A1* | 6/2010 | Lee | G02B 6/0053 | 362/609 |
| 2011/0090142 A1* | 4/2011 | You | G02B 6/0043 | 345/102 |
| 2011/0170278 A1* | 7/2011 | Tordini | G02B 19/0095 | 362/84 |
| 2011/0176327 A1* | 7/2011 | Iwasaki | G02B 6/0043 | 362/606 |
| 2011/0267839 A1* | 11/2011 | Kang | G02B 6/0096 | 362/609 |
| 2012/0063160 A1* | 3/2012 | Frankiewicz | F21L 4/00 | 362/555 |
| 2012/0250293 A1* | 10/2012 | Jeong | G02F 1/133615 | 362/97.2 |

* cited by examiner

SURFACE LIGHT SOURCE DEVICE AND DISPLAY DEVICE

TECHNICAL FIELD

This invention relates to a surface light source device which includes a light-emitting element such as LED as a light source and is capable of radiating light of the light source in a planar fashion from the back side of a member to be illuminated (for example, a liquid crystal display panel or an advertisement display panel), and to a display (for example, a liquid crystal display or an advertisement display) including the surface light source device.

BACKGROUND ART

Conventionally, there is known surface light source device 100 in which a light guide plate is not used, as illustrated in FIG. 56. In surface light source device 100 illustrated in FIG. 56, a plurality of light-emitting elements 103 are attached to opposing side walls 102 and 102 of hollow casing 101 so as to face each other. Light from light-emitting element 103 is radiated to internal space 105 of casing 101 through rod-shaped cylindrical lens 104. The light radiated through cylindrical lens 104 is diffused and reflected toward the roof side (the side opposite to bottom 106 of casing 101) by reflection member 107 disposed on bottom 106 of casing 101. The light reflected by reflection member 107 is emitted in a planar fashion from opening (display window) 110 of the roof toward the outside of casing 101 through light diffusion plate 108 (see PTL 1).

CITATION LIST

Patent Literature

PTL 1
Japanese Patent Application Laid-Open No. 2007-87658

SUMMARY OF INVENTION

Technical Problem

However, in surface light source device 100 illustrated in FIG. 56, light emitted from light-emitting element 103 at a wide angle is reflected by reflection member 107 before it reaches cylindrical lens 104. In this way the light reflected by reflection member 107 is not collected by cylindrical lens 104 but emitted out of casing 101 from an area near light-emitting element 103. As a result, in the planar illuminating light emitted from opening 110 of the roof, the light emitted from an area near light-emitting element 103 more brightly stands out from light emitted from the other areas, and in addition thereto, there is a possibility that unevenness in luminance of planar illuminating light is caused since the luminance of emitted light decreases as the distance from light-emitting element 103 increases (see the description in paragraph 0022 of PTL 1).

In order to correct such a defect, a configuration is conceivable in which the space between light-emitting element 112 and cylindrical lens 113 is surrounded by thermal conductive sheet 114 made of black graphite so that thermal conductive sheet 114 absorbs light which is emitted from light-emitting element 112 at a wide angle and does not enter cylindrical lens 113, as surface light source device 111 illustrated in FIG. 57 (see paragraphs 0023 and 0024 and FIGS. 6 and 7 of PTL 1). However, when thermal conductive sheet 114 is used in the above-mentioned manner, there is another problem that the use efficiency of light decreases as thermal conductive sheet 114 absorbs light, thus decreasing the luminance of the illuminating light. Further, in surface light source device 111 illustrated in FIG. 57, the luminance of illuminating light decreases as the distance from light-emitting element 112 increases, and thus the luminance of light emitted from a center area of light diffusion plate 115 is insufficient, and consequently, unevenness in the luminance of the planar illuminating light may not be suppressed.

An object of the present invention is to provide a surface light source device which can achieve bright and uniform planar illumination by suppressing luminance unevenness of emitted light without decreasing use efficiency of light, and a display including the surface light source device.

Solution to Problem

A surface light source device according to the invention of claim 1 includes: a bottom surface; side walls; an internal space surrounded by the bottom surface and the side walls and having an opening on a roof side opposite to the bottom surface; a light-emitting device disposed on an internal surface of a pair of the side walls facing each other; a reflection member disposed on the bottom surface or as the bottom surface, the reflection member being configured to reflect light emitted from the light-emitting device; a light diffusion plate disposed so as to cover the opening, the light diffusion plate being configured to allow the light from the light-emitting device to pass therethrough and diffuse the light from the light-emitting device. In this invention, the light-emitting device includes a light-emitting element and a light flux controlling member, the light flux controlling member being disposed in a one-to-one relationship with the light-emitting element, and configured to collect light from the light-emitting element and emit the light toward one of the pair of the side walls on the opposite side, the light-emitting element is disposed on the internal surface of the side wall in such a manner that an optical axis of the light-emitting element is orthogonal to the internal surface of the pair of the side walls and in parallel to the bottom surface when the optical axis is defined as a travelling direction of light that is in the center of three-dimensional light flux light flux emitted from the light-emitting element, the reflection member includes a specular reflection region and a diffuse reflection region on the internal space side, and the specular reflection region is disposed near the light-emitting device in such a manner that the specular reflection region reflects the light emitted from the light-emitting device in a direction away from the light-emitting device so as to prevent an increase in a brightness in an area near the light-emitting device of the surface light source device and prevent a decrease in the brightness in a central area of the surface light source device.

In the surface light source device according to claim 1, a surface light source device according to the invention of claim 2 is characterized as follows. Specifically, the specular reflection region is a belt-shaped region extending in a direction orthogonal to the optical axis and having a predetermined width, and when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 18.5° or greater and the bottom surface, the end line of the specular reflection region is provided at an intersection of light having a light distribution angle θ of 2° or greater and the bottom surface, and a distance between the start line and the end line is equal to or greater than 20 mm.

In the surface light source device according to claim 1, a surface light source device according to the invention of claim 3 is characterized as follows. Specifically, the specular reflection region is a belt-shaped region extending in a direction orthogonal to the optical axis and having a predetermined width, and when an edge of the specular reflection region located at a position near the light-emitting element is a start line whereas an edge of the specular reflection region located at a position distant from the light-emitting element relative to the start line is an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 30.5° or greater and the bottom surface, the end line of the specular reflection region is provided at an intersection of light having a light distribution angle θ of 2° or greater and the bottom surface, and a distance between the start line and the end line is equal to or greater than 20 mm.

In the surface light source device according to claim 1, a surface light source device according to the invention of claim 4 is characterized as follows. Specifically, the light diffusion plate is a layer sequence including a prism sheet and a light diffusion sheet, the prism sheet being provided with a plurality of grooves each having a substantially triangular shape in cross-sectional view, the grooves extending along the optical axis and formed in a direction orthogonal to the optical axis, the light diffusion sheet being configured to allow light from the light-emitting device having passed through the prism sheet to pass therethrough while diffusing the light from the light-emitting device having passed through the prism sheet. In addition, in the prism sheet, inclined surfaces defining the groove reflect part of the light from the light-emitting device to thereby guide the light. In addition, the specular reflection region is a belt-shaped region extending in a direction orthogonal to the optical axis and having a predetermined width, and when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 18.5° or greater and the bottom surface, the end line of the specular reflection region is provided at an intersection of light having a light distribution angle θ of 5.5° or greater and the bottom surface, and a distance between the start line and the end line is equal to or greater than 20 mm.

In the surface light source device according to claim 1, a surface light source device according to the invention of claim 5 is characterized as follows. Specifically, the light diffusion plate is a layer sequence including a prism sheet and a light diffusion sheet, the prism sheet being provided with a plurality of grooves each having a substantially triangular shape in cross-sectional view, the grooves extending along the optical axis and formed in a direction orthogonal to the optical axis, the light diffusion sheet being configured to allow light from the light-emitting device having passed through the prism sheet to pass therethrough while diffusing the light from the light-emitting device having passed through the prism sheet. In addition, in the prism sheet, inclined surfaces defining the groove reflect part of the light from the light-emitting device to thereby guide the light. In addition, the specular reflection region is a belt-shaped region extending in a direction orthogonal to the optical axis and having a predetermined width, when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 30.5° or greater and the bottom surface, the end line of the specular reflection region is provided at an intersection of light having a light distribution angle θ of 5.5° or greater and the bottom surface, and a distance between the start line and the end line is equal to or greater than 20 mm.

In the surface light source device according to claims 1 to 5, a surface light source device according to the invention of claim 6 is characterized as follows. Specifically, the light flux controlling member is disposed in such a manner that a central axis thereof matches the optical axis, the light flux controlling member including an incident surface from which the light from the light-emitting element enters the light flux controlling member, a total reflection surface that totally-reflects part of light having entered the light flux controlling member from the incident surface so as to collect the light, and an emission surface that emits light reflected by the total reflection surface and light having directly reached thereto from the incident surface. The incident surface is an internal surface of a recess formed on a rear surface side so as to face the light-emitting element, the incident surface including a first incident surface located at a bottom of the recess, and a second incident surface located between the first incident surface and an edge of an opening of the recess. In addition, the total reflection surface is formed between the rear surface side and the emission surface side so as to surround the optical axis and totally reflect light entered mainly from the second incident surface of the incident surface toward the emission surface side. In addition, the emission surface is formed around the optical axis on an opposite side of the rear surface, the emission surface including a first emission surface disposed on the reflection member side relative to the optical axis, and a second emission surface disposed on a side distant from the reflection member relative to the first emission surface. In addition, the second emission surface is so formed that light emitted from the second emission surface has a greater light flux directed toward the reflection member side in comparison with a light distribution property of light emitted from a surface which is obtained by turning the first emission surface by 180° about the optical axis of the light-emitting element.

A display according to the invention of claim 7 is characterized in that the display includes the surface light source device according to any one of claims 1 through 6; and an illuminated member to be illuminated by planar illuminating light emitted from the surface light source device.

Advantageous Effects of Invention

According to the present invention, a specular reflection region of a reflection member disposed on a bottom surface of a casing reflects light emitted from a light-emitting device toward a direction away from the light-emitting device, whereby the brightness of planar illuminating light emitted from a light diffusion plate can be decreased in an area near the light-emitting device, and the brightness of the planar illuminating light emitted from the light diffusion plate can be increased at a center portion, and consequently, bright and uniform planar illumination can be achieved by suppressing luminance unevenness of emitted light, without decreasing use efficiency of light.

DESCRIPTION OF EMBODIMENTS

Now, embodiments of the present invention will be described with reference to the accompanying drawings.

[First Embodiment]

Now, a surface light source device according to the first embodiment of the present invention will be described.

Figure 1A:
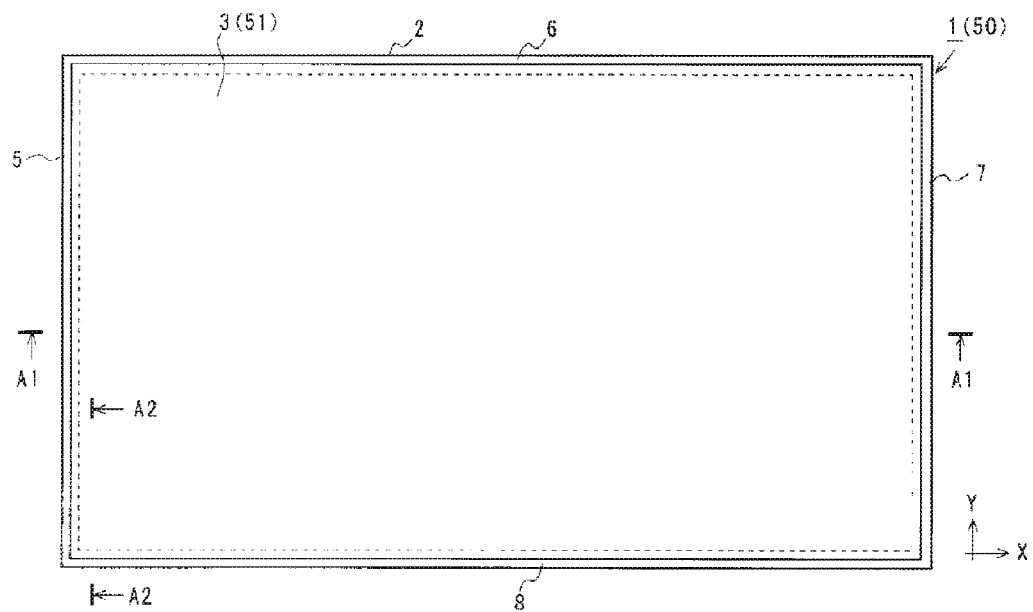
FIG. 1A is a plan view of a surface light source device according to a first embodiment of the present invention.
Figure 1B:
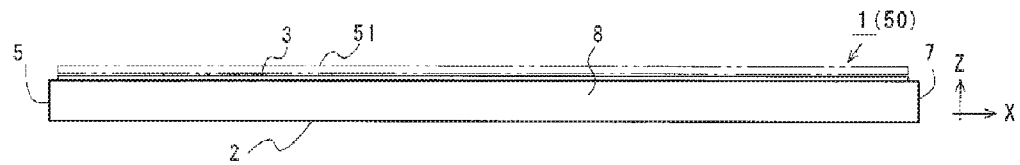
FIG. 1B is a front view of the surface light source device according to the first embodiment of the present invention.
Figure 2A:
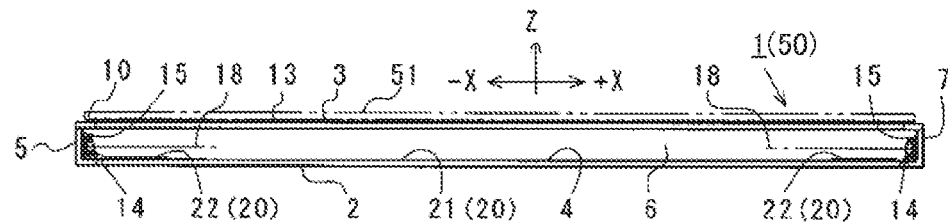
FIG. 2A is a cross-sectional view of in the surface light source device according to the first embodiment of the present invention taken along line A1-A1 of FIG. 1A.
Figure 2B:
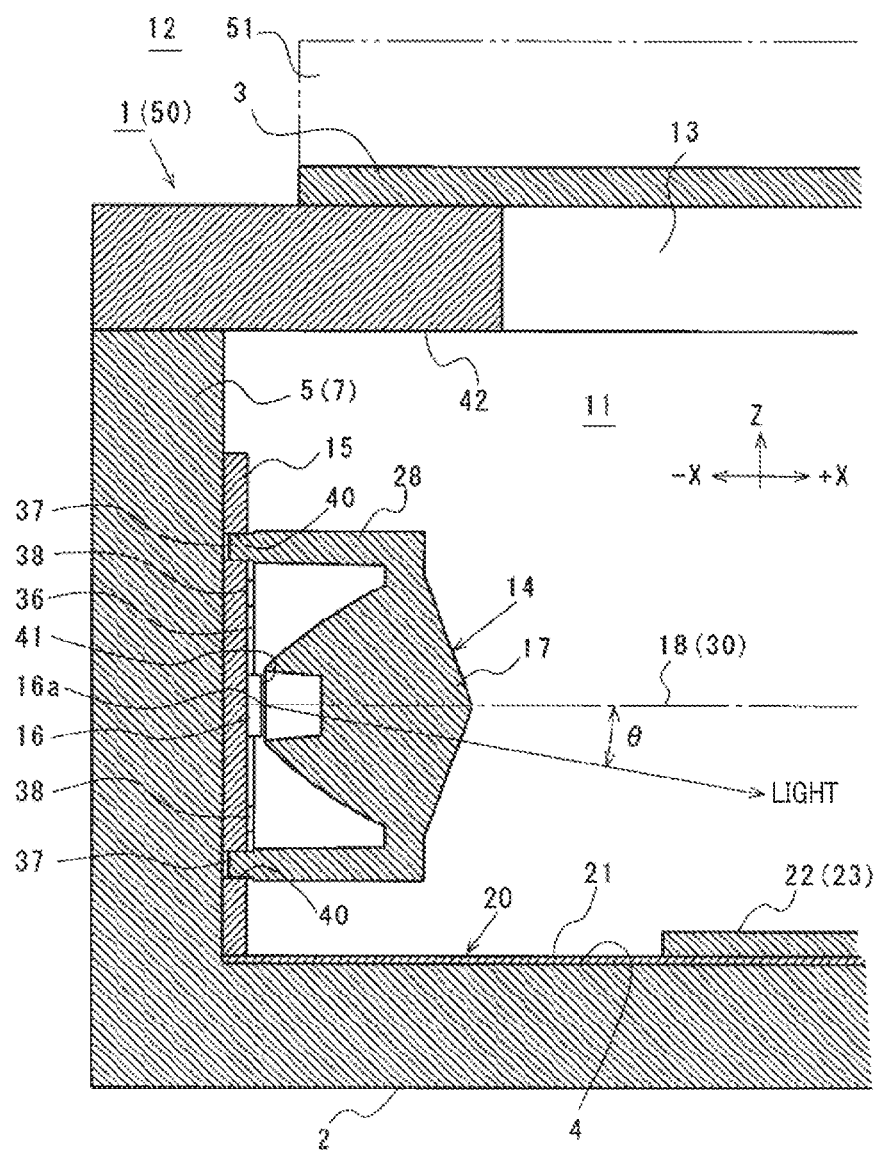
FIG. 2B is an enlarged cross-sectional view of a part of the surface light source device of FIG. 2A.
Figure 3:
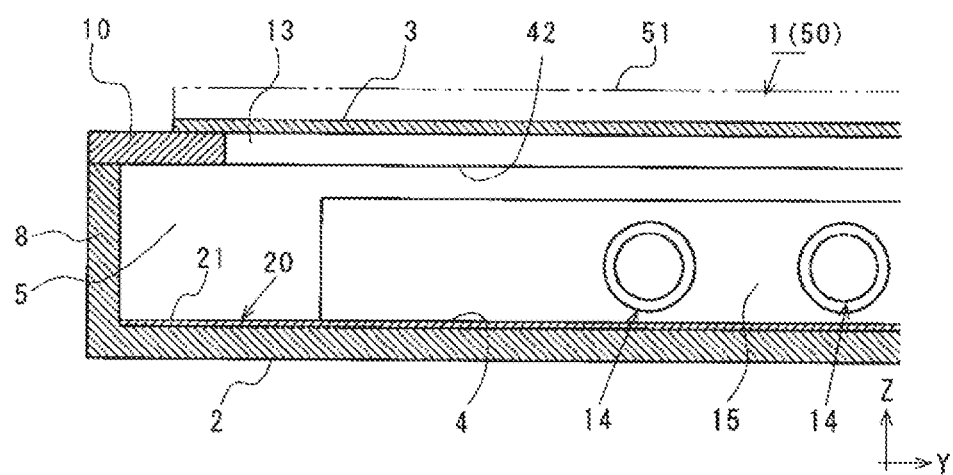
FIG. 3 is an enlarged cross-sectional view of a part of the surface light source device according to the first embodiment of the present invention taken along line A2-A2 of FIG. 1A.

FIG. 1A to FIG. 3 illustrate surface light source device 1 according to the first embodiment of the present invention. FIG. 1A is a plan view of surface light source device 1. FIG. 1B is a front view of surface light source device 1. FIG. 2A is a cross-sectional view of surface light source device 1 taken along line A1-A1 of FIG. 1A. FIG. 2B is an enlarged cross-sectional view illustrating a part of surface light source device 1 of FIG. 2A. FIG. 3 is an enlarged cross-sectional view of a part of surface light source device 1 taken along line A2-A2 of FIG. 1A.

As illustrated in these figures, surface light source device 1 includes casing 2 having a rectangular shape in plan view, and light diffusion plate 3 having a rectangular shape in plan view that allows planar illuminating light emitted from the inside of casing 2 to pass therethrough.

Casing 2 is made of a material such as synthetic resin materials (for example, PC or PMMA) and metal materials (for example, SUS or Al). Along the outer edge of bottom surface 4 having a rectangular shape in plan view, first to fourth side walls 5 to 8 are uprightly provided. Roof frame 10 is fixed on the end of each of first to fourth side walls 5 to 8. Opening 13 that connects internal space 11 with outside space 12 is formed in roof frame 10. Here, in casing 2 in plan view, the short sides facing each other are first side wall 5 and third side wall 7, and the long sides facing each other are second side wall 6 and fourth side wall 8. In addition, in casing 2 of FIG. 1A, first to fourth side walls 5 to 8 are sequentially disposed along the clockwise direction. Roof frame 10 defines a frame region having a certain width along the ends of first to fourth side walls 5 to 8, and opening 13 having a rectangular shape in plan view is formed inside the frame region.

Figure 4A:
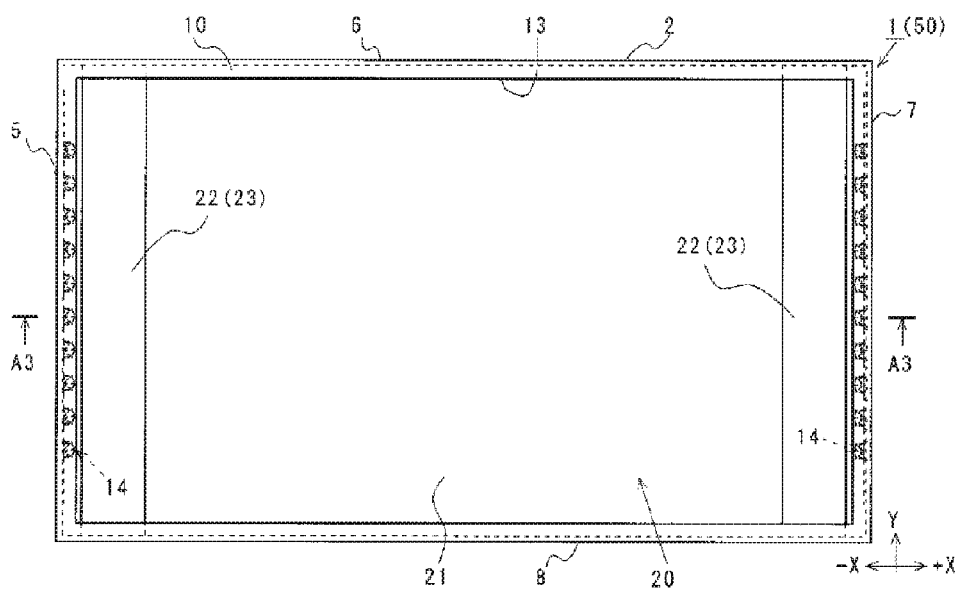
FIG. 4A is a plan view illustrating the surface light source device according to the first embodiment of the present invention with the light diffusion plate removed.
Figure 4B:
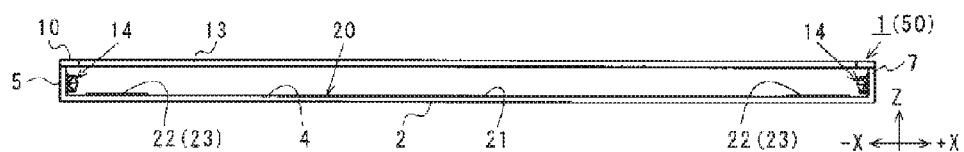
FIG. 4B is a cross-sectional view of the surface light source device taken along line A3-A3 of FIG. 4A.
Figure 5A:
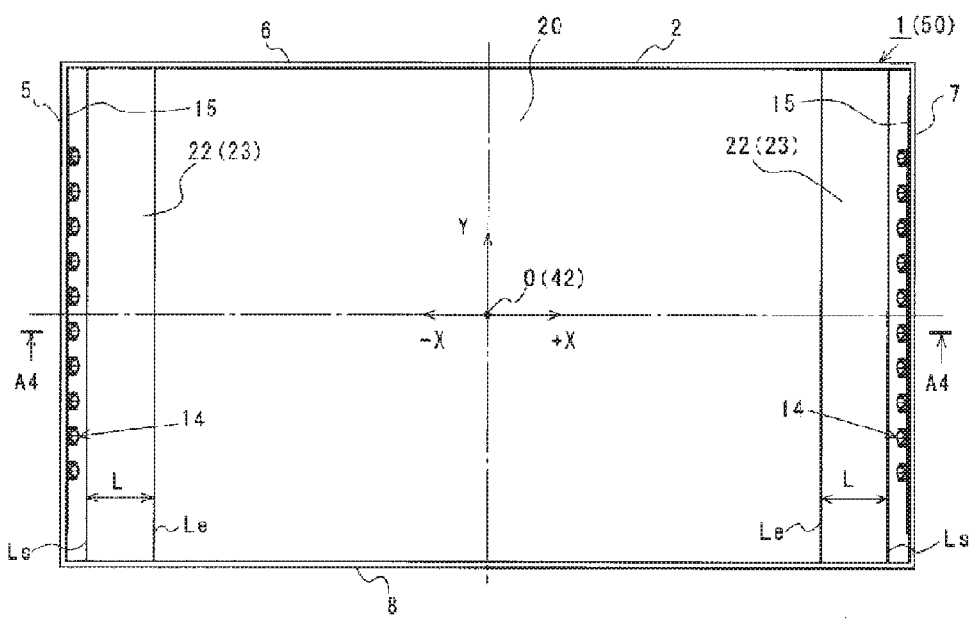
FIG. 5A is a plan view illustrating the surface light source device according to the first embodiment of the present invention with the light diffusion plate and a roof frame removed.
Figure 5B:
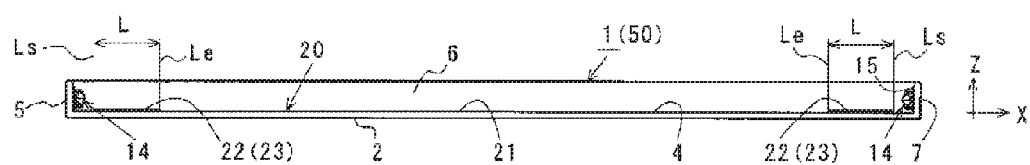
FIG. 5B is a cross-sectional view of the surface light source device taken along line A4-A4 of FIG. 5A.

FIG. 4A is a plan view illustrating surface light source device 1 with light diffusion plate 3 removed. FIG. 4B is a cross-sectional view of surface light source device 1 taken along line A3-A3 of FIG. 4A. In addition, FIG. 5A is a plan view illustrating surface light source device 1 with light diffusion plate 3 and roof frame 10 removed. FIG. 5B is a cross-sectional view of surface light source device 1 taken along line A4-A4 of FIG. 5A.

As illustrated in these figures, on the internal surfaces of first side wall 5 and third side wall 7, a plurality of light-emitting devices 14 are arranged at even intervals along the Y direction in FIGS. 4A to 5B. Light-emitting devices 14 on first side wall 5 side and light-emitting devices 14 on third side wall 7 side are positioned so as to face each other with respect to the virtual line extending along the X direction in FIGS. 4A to 5B. Light-emitting devices 14 include a plurality of light-emitting elements 16 (for example, LEDs) mounted on substrate 15 fixed on the internal surface of first side wall 5 and the internal surface of third side wall 7, and light flux controlling member 17 which is disposed in a one-to-one relationship with the light-emitting element 16 and is configured to collect light from light-emitting element 16 and emit the collected light toward the side wall on the opposite side (in the direction along +X direction or −X direction in FIG. 2). Here, assuming that the travelling direction of light that is in the center of three-dimensional light flux emitted from light-emitting element 16 is optical axis 18, light-emitting element 16 on first side wall 5 side is arranged on first side wall 5 with substrate 15 therebetween such that optical axis 18 is orthogonal to the internal surface of first side wall 5 and is in parallel to bottom surface 4. Likewise, assuming that the travelling direction of light that is in the center of three-dimensional light flux emitted from light-emitting element 16 is optical axis 18, light-emitting element 16 on first side wall 7 side is arranged on first side wall 5 with substrate 15 therebetween such that optical axis 18 is orthogonal to the internal surface of first side wall 7 and is in parallel to bottom surface 4 (see FIG. 2A).

On bottom surface 4 of casing 2, reflection member 20 having the same planar shape as bottom surface 4 is formed. Reflection member 20 includes first reflection member 21 made of a synthetic resin material (for example, PET) which is formed in a sheet shape so as to exercise a function of diffusely reflecting light, and second reflection member 22 composed of a thin-plate material (for example, aluminum or stainless-steel) which is firmly fixed on a part of the surface of first reflection member 21 for specular reflection of light. In reflection member 20, an exposed region (a portion not covered by second reflection member 22) of the surface of first reflection member 21 serves as a diffuse reflection region, and a mirror-finished surface of second reflection member 22 serves as specular reflection region 23.

Specular reflection region 23 of reflection member 20 is a rectangular-shaped region in plan view which extends from the internal surface of second side wall 6 to the internal surface of fourth side wall 8. A pair of specular reflection regions 23 are disposed on first side wall 5 side and third side wall 7 side. In reflection region 23, start line (start edge) Ls provided at a position near light-emitting devices 14 is in parallel to first side wall 5 or third side wall 7, and end line (end edge) Le provided at a position distant from light-emitting devices 14 is in parallel to first side wall 5 or third side wall 7. Specular reflection region 23 of reflection member 20 reflects light from light-emitting devices 14 in such a manner that the light reaches a position remote from light-emitting devices 14. It is to be noted that, as described later, the positions of start line Ls and end line Le of specular reflection region 23 are determined so as to prevent an increase in a brightness in an area near light-emitting devices 14 of surface light source device 1 and prevent a decrease in the brightness in a central area of surface light source device 1.

Light diffusion plate 3 is made of a highly light-transmissive synthetic resin material (such as PET, PMMA, and PC) and has a rectangular shape in plan view. Light diffusion plate 3 is subjected to a conventionally-known light diffusion treatment and thus has a light diffusion function of diffusing light while allowing the light to pass therethrough. Light diffusion plate 3 is mounted on the exterior surface of the frame region of roof frame 10 so as to cover opening 13 of roof frame 10 and diffuse light passing through opening 13 while allowing the light to pass therethrough.

(Details of Light flux Controlling Member)

Figure 6A:
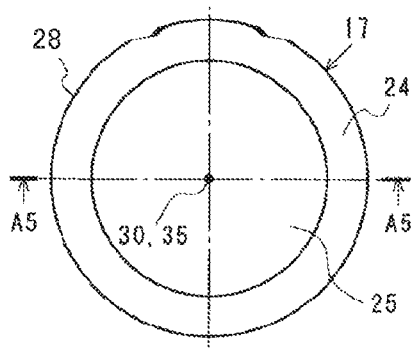
FIG. 6A is a plan view of a light flux controlling member.
Figure 6B:
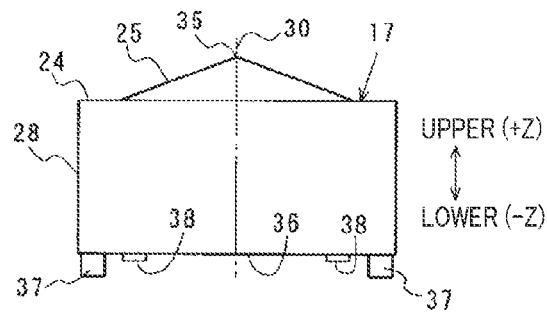
FIG. 6B is a front view of the light flux controlling member.
Figure 6C:
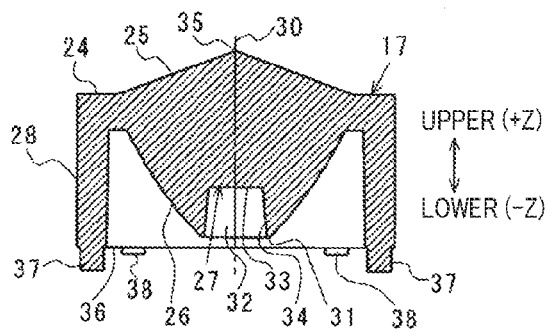
FIG. 6C is a cross-sectional view of the light flux controlling member of FIG. 6A taken along line A5-A5.
Figure 6D:
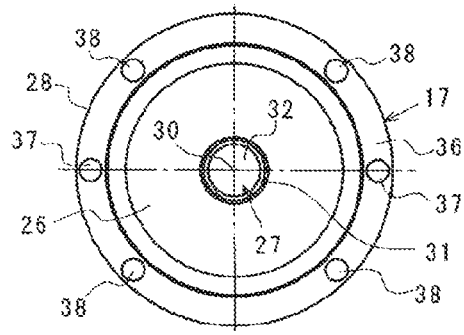
FIG. 6D is a bottom view of the light flux controlling member.

FIGS. 6A to 6D illustrate details of light flux controlling member 17. FIG. 6A is a plan view of light flux controlling member 17, FIG. 6B is a front view of light flux controlling member 17, FIG. 6C is a cross-sectional view of light flux controlling member 17 of FIG. 6A taken along line A5-A5, and FIG. 6D is a bottom view of light flux controlling member 17.

Light flux controlling member 17 is made of, for example, a transparent resin material such as PMMA (polymethylmethacrylate), PC (polycarbonate) and EP (epoxy resin) or transparent glass. In light flux controlling member 17, emission surface 25 is formed on the top surface side of ring-shaped flange 24, and total reflection surface 26 and incident surface 27 are formed on the bottom surface side of flange 24. In addition, on the lower side of the external periphery of flange 24, cylindrical holder section 28 is formed so as to surround total reflection surface 26. Light flux controlling member 17 is attached to substrate 15 on which light-emitting element 16 is mounted, in such a manner that central axis 30 is positioned coaxially with optical axis 18 of light-emitting element 16 (see FIG. 2B).

Incident surface 27 is the internal surface of recess 32 formed on rear surface 31 side of light flux controlling member 17. The cross-sectional shape of incident surface 27 is an isosceles trapezoid shape, and incident surface 27 is rotationally symmetrical about central axis 30. Incident surface 27 includes first incident surface 33 which is the bottom surface of recess 32, and second incident surface 34 which is a tapered cylindrical surface extending from first incident surface 33 to the edge of the opening of recess 32. Here, the inner diameter of second incident surface 34 gradually increases toward the edge of the opening from first incident surface 33 such that the inner diameter of the edge of the opening is greater than the inner diameter of the edge on first incident surface 33 side. It is to be noted that rear surface 31 of light flux controlling member 17 is a ring-shaped plane formed around the edge of the opening of recess 32, and is a plane positioned on a virtual plane orthogonal to central axis 30.

Total reflection surface 26 is the exterior surface extending from the external peripheral edge of rear surface 31 to the bottom surface of flange 24. Total reflection surface 26 is a rotationally symmetrical surface (exterior surface having a substantially truncated cone shape) formed so as to surround central axis 30. The outer diameter of total reflection surface 26 gradually increases from rear surface 31 toward flange 24. In addition, the generatrix of total reflection surface 26 is an arc-shaped curve which protrudes outwardly (in the direction away from central axis 30) (see FIG. 6C).

Emission surface 25 is a substantially cone-shaped aspherical surface formed around central axis 30. Emission surface 25 is so formed that vertex 35 is located on central axis 30, and that the maximum diameter of the lower edge (edge on flange 24) is equal to or greater than the maximum diameter of total reflection surface 26.

As illustrated in FIG. 6C, the lower end surface (end surface in the -Z axis direction) 36 of holder section 28 is located downwardly of the lower edge (edge in the -Z axis direction) of total reflection surface 26. On lower end surface 36 of holder section 28, a pair of round-bar shaped first positioning protrusions 37 are formed so as to protrude downward (the −Z axis direction) at positions symmetric about central axis 30. In addition, on lower end surface 36 of holder section 28, four round-bar shaped second positioning protrusions 38 are formed so as to surround central axis 30 at even intervals. First positioning protrusions 37 are fitted to positioning holes 40 of substrate 15 on which light-emitting element 16 is mounted. First positioning protrusions 37 set the position of light flux controlling member 17 with respect to light-emitting element 16 in such a manner that central axis 30 of light flux controlling member 17 is concentric to optical axis 18 of light-emitting element 16 (see FIG. 2B). In addition, second positioning protrusions 38 are protrusions having a height lower than that of first positioning protrusions 37. Second positioning protrusions 38 are put on (or brought into abutment with) substrate 15 on which light-emitting element 16 is mounted, so as to set the position of light flux controlling member 17 in a direction of optical axis 18 of light-emitting element 16 with respect to light emission surface 41 of light-emitting element 16 (see FIG. 2B). Further, as illustrated in FIG. 2B, when light flux controlling member 17 is attached to substrate 15, the lower end surface 36 of holder section 28 is located on substrate 15 side relative to light emission surface 41 of light-emitting element 16. With this structure, light emitted from light emission surface 41 of light-emitting element 16 is not likely to leak from the gap between lower end surface 36 of holder section 28 and substrate 15. It is to be noted that second positioning protrusions 38 are fixed to substrate 15 by bonding.

In light flux controlling member 17 having the above-mentioned structure, of the light from light-emitting element 16, light coming through first incident surface 33 directly reaches emission surface 25, while light coming through second incident surface 34 is totally reflected and collected by total reflection surface 26 and then reaches emission surface 25. Then, emission surface 25 of light flux controlling member 17 emits the light from light-emitting element 16 toward internal space 11 of casing 2 (see FIG. 2B).

(Determination of Position of Start Line (Start Edge) of Specular Reflection Region)

Figure 7:
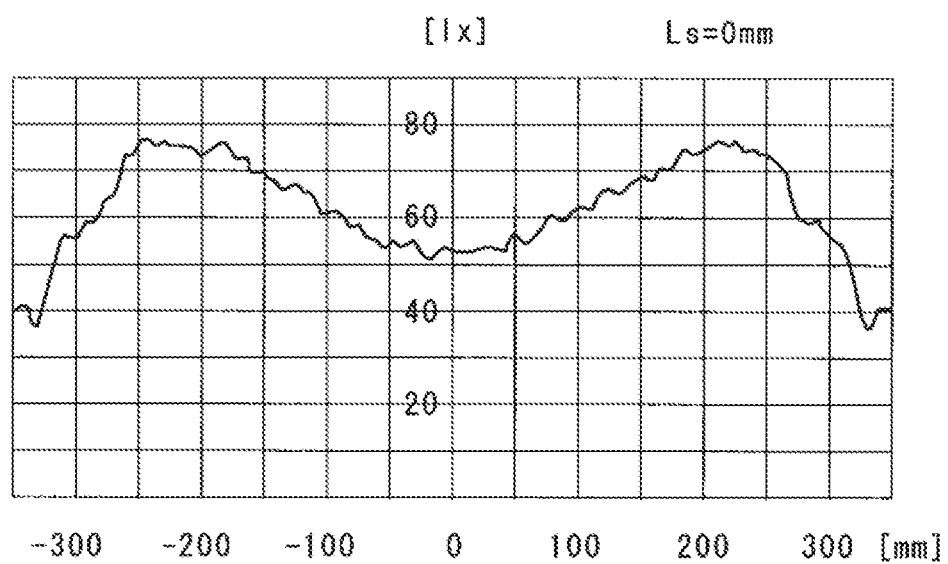
FIG. 7 is an illuminance distribution graph of an illuminated surface in the case where start line Ls of the specular reflection region is set at 0 mm in the surface light source device according to the first embodiment of the present invention.
Figure 8:
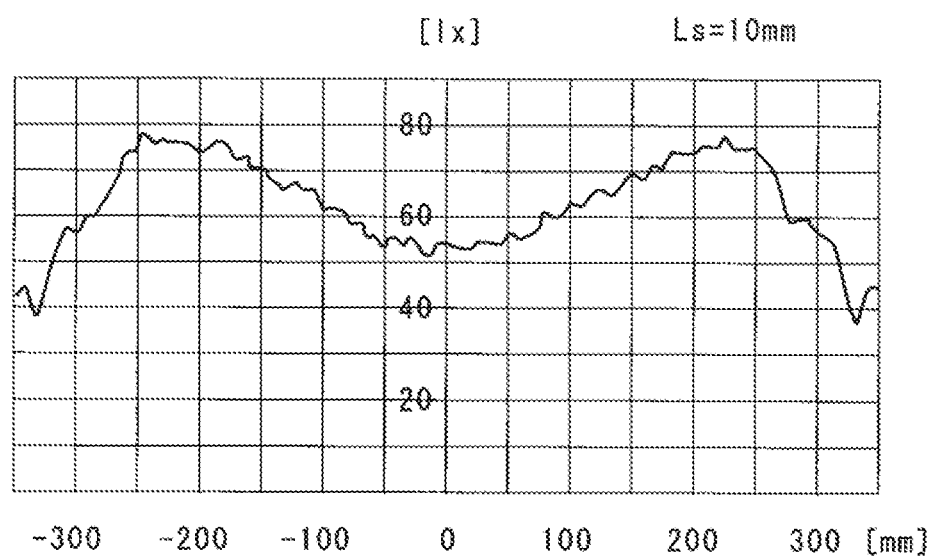
FIG. 8 is an illuminance distribution graph of the illuminated surface in the case where start line Ls of the specular reflection region is set at 10 mm in the surface light source device according to the first embodiment of the present invention.
Figure 9:
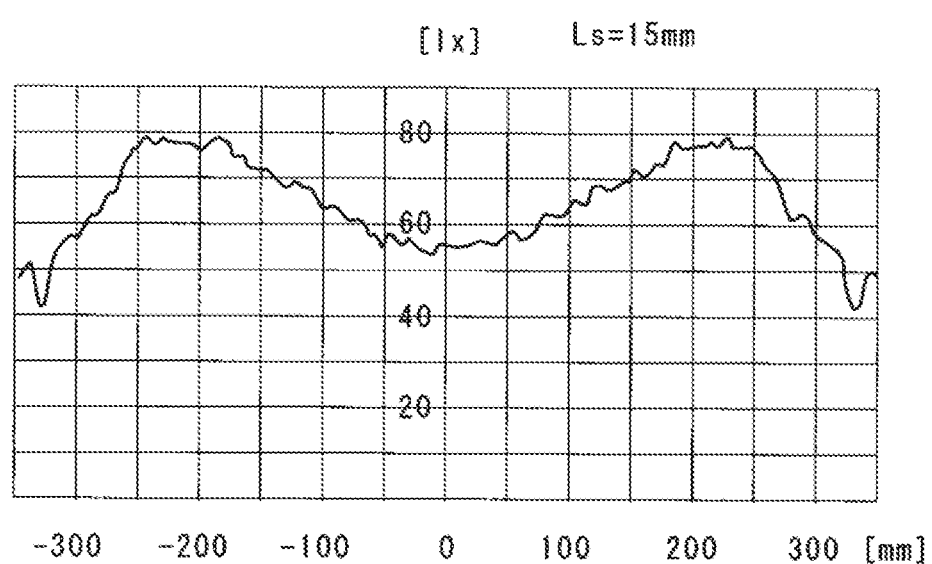
FIG. 9 is an illuminance distribution graph of the illuminated surface in the case where start line Ls of the specular reflection region is set at 15 mm in the surface light source device according to the first embodiment of the present invention.
Figure 10:
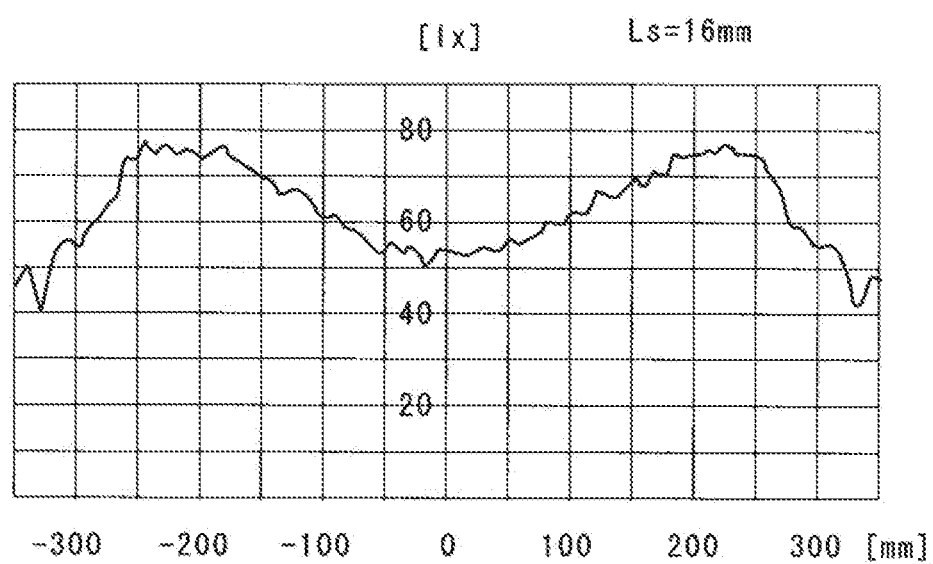
FIG. 10 is an illuminance distribution graph of the illuminated surface in the case where start line Ls of the specular reflection region is set at 16 mm in the surface light source device according to the first embodiment of the present invention.
Figure 11:
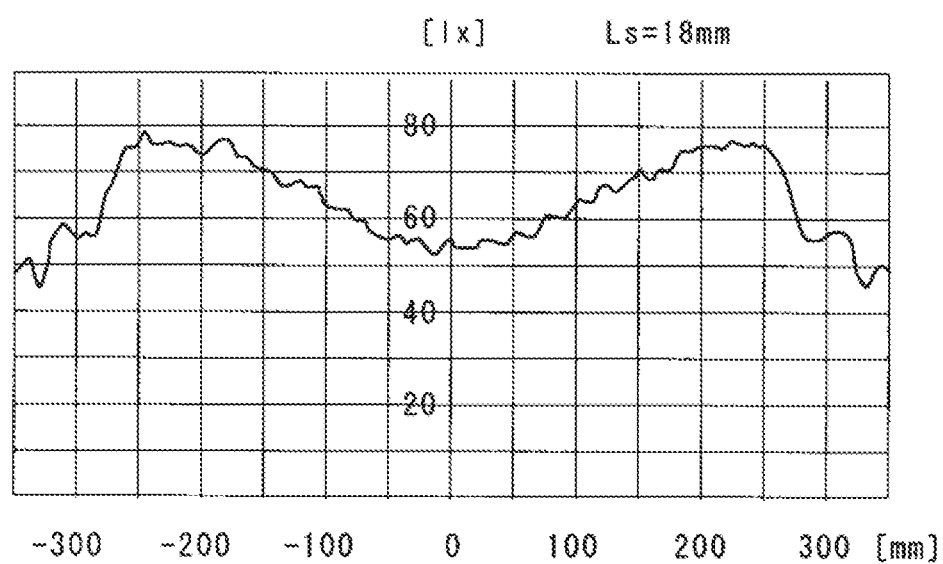
FIG. 11 is an illuminance distribution graph of the illuminated surface in the case where start line Ls of the specular reflection region is set at 18 mm in the surface light source device according to the first embodiment of the present invention.
Figure 12:
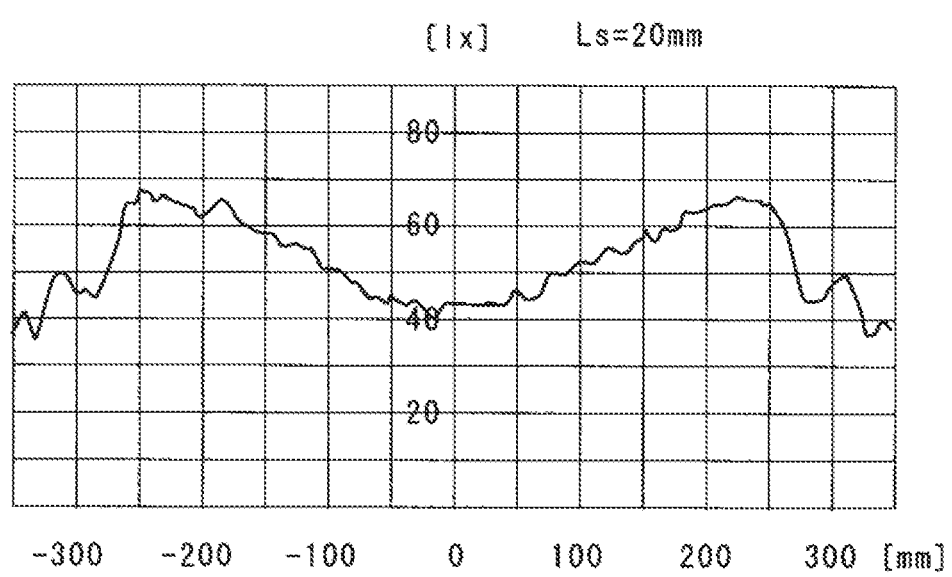
FIG. 12 is an illuminance distribution graph of the illuminated surface in the case where start line Ls of the specular reflection region is set at 20 mm in the surface light source device according to the first embodiment of the present invention.
Figure 13:
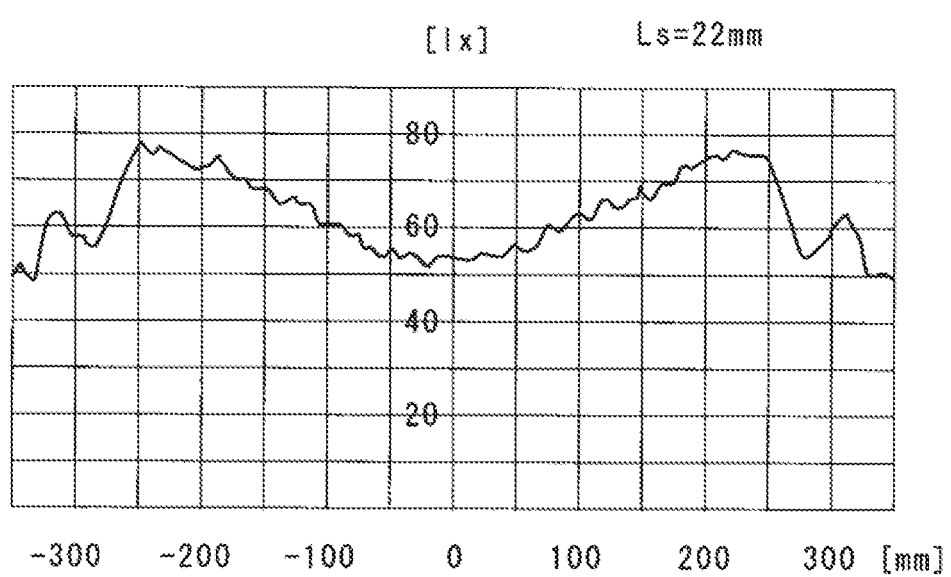
FIG. 13 is an illuminance distribution graph of the illuminated surface in the case where start line Ls of the specular reflection region is set at 22 mm in the surface light source device according to the first embodiment of the present invention.
Figure 14:
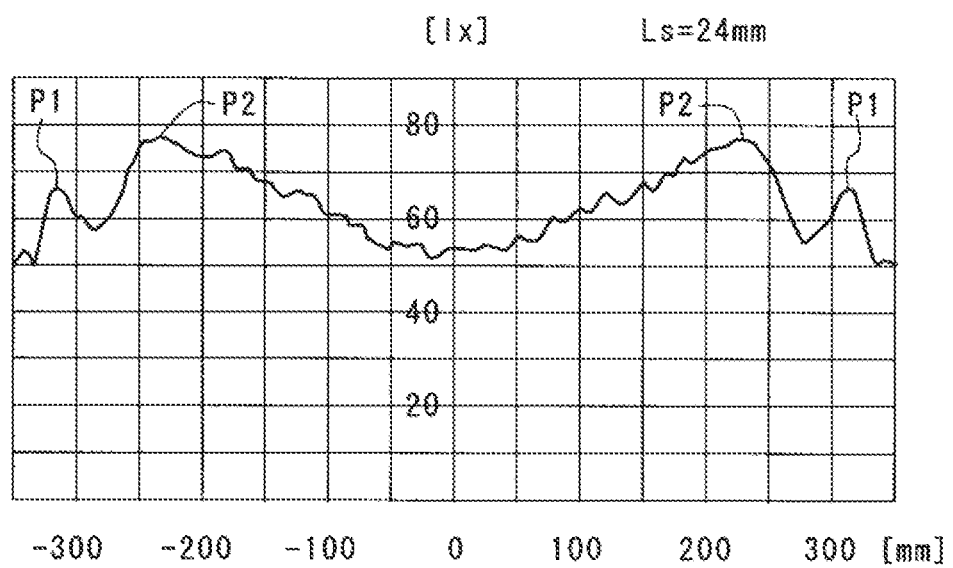
FIG. 14 is an illuminance distribution graph of the illuminated surface in the case where start line Ls of the specular reflection region is set at 24 mm in the surface light source device according to the first embodiment of the present invention.
Figure 15:
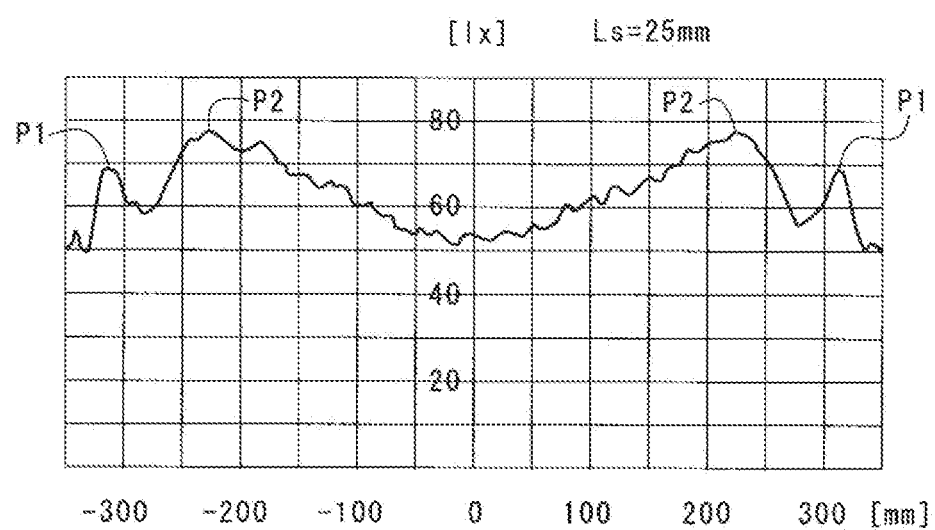
FIG. 15 is an illuminance distribution graph of the illuminated surface in the case where start line Ls of the specular reflection region is set at 25 mm in the surface light source device according to the first embodiment of the present invention.
Figure 16:
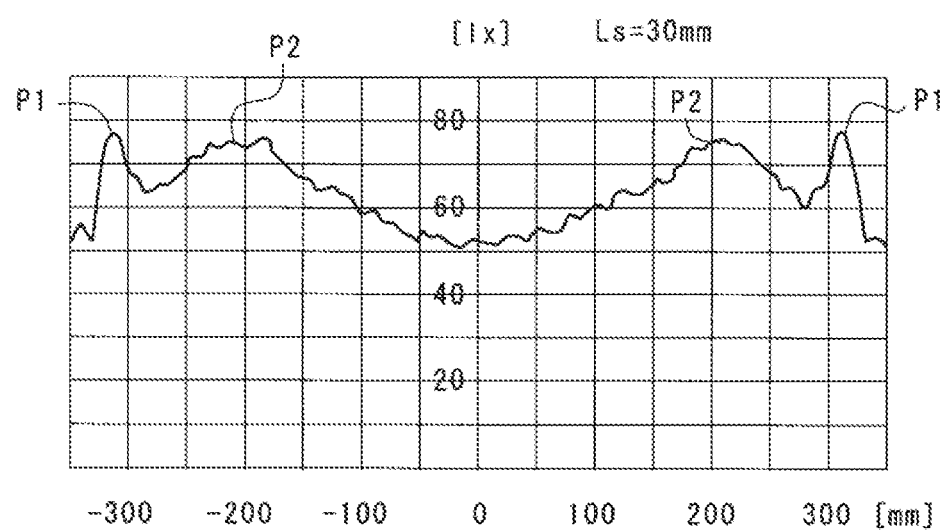
FIG. 16 is an illuminance distribution graph of the illuminated surface in the case where start line Ls of the specular reflection region is set at 30 mm in the surface light source device according to the first embodiment of the present invention.
Figure 17:
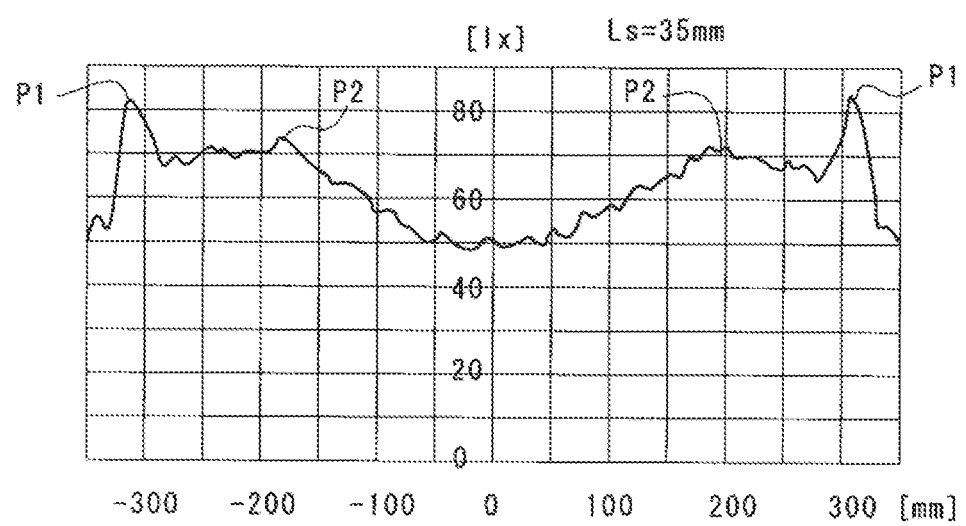
FIG. 17 is an illuminance distribution graph of the illuminated surface in the case where start line Ls of the specular reflection region is set at 35 mm in the surface light source device according to the first embodiment of the present invention.
Figure 18:
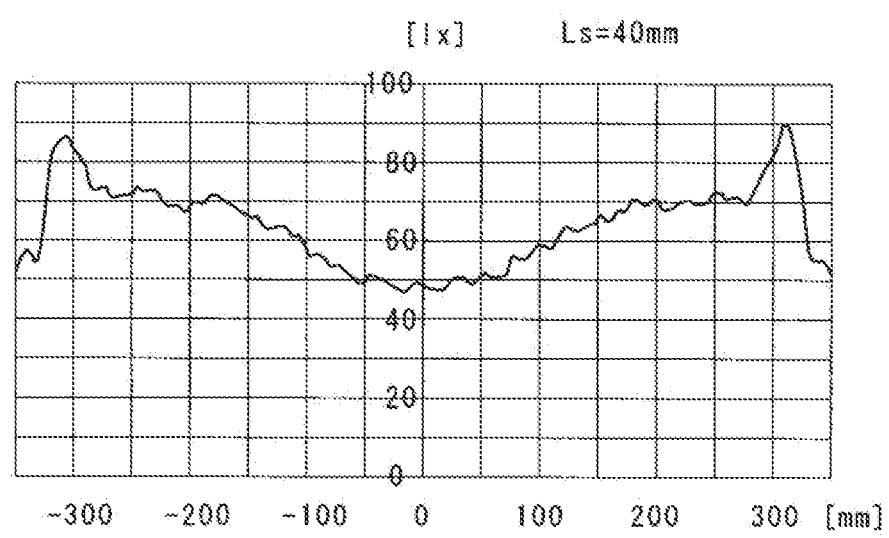
FIG. 18 is an illuminance distribution graph of the illuminated surface in the case where start line Ls of the specular reflection region is set at 40 mm in the surface light source device according to the first embodiment of the present invention.
Figure 19:
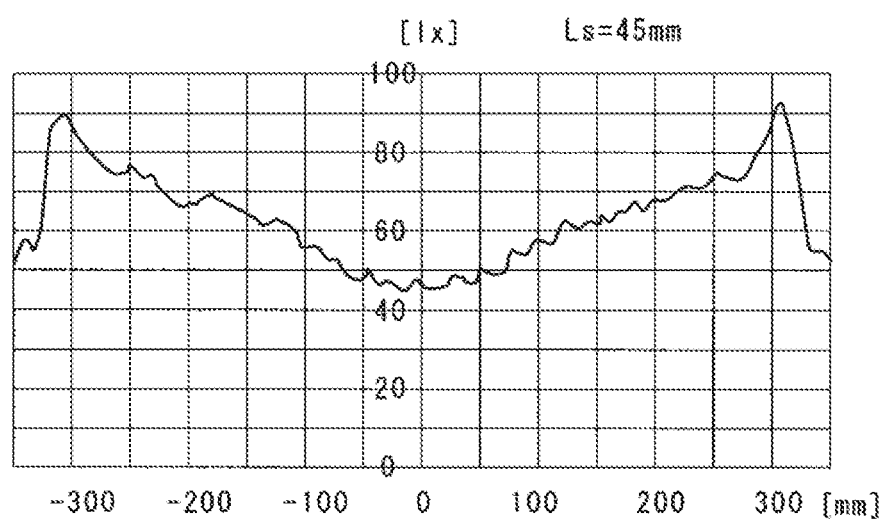
FIG. 19 is an illuminance distribution graph of the illuminated surface in the case where start line Ls of the specular reflection region is set at 45 mm in the surface light source device according to the first embodiment of the present invention.
Figure 20:
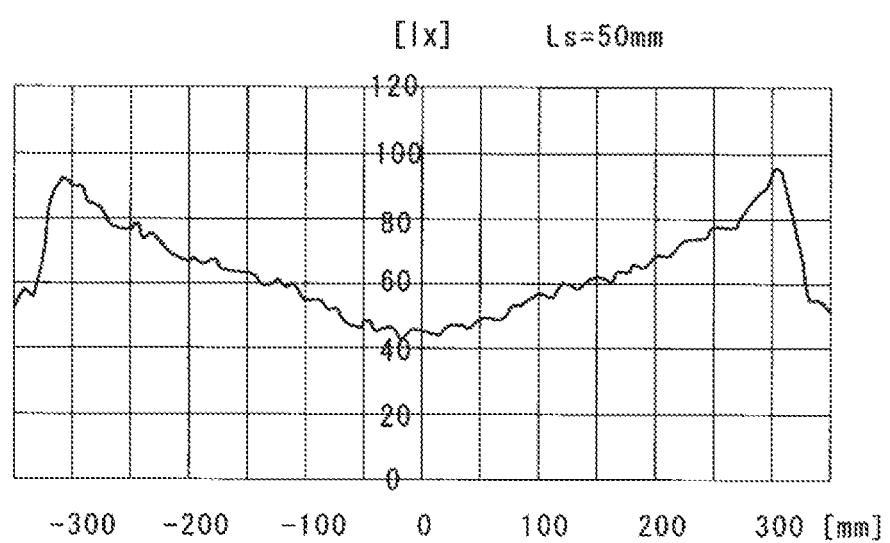
FIG. 20 is an illuminance distribution graph of the illuminated surface in the case where start line Ls of the specular reflection region is set at 50 mm in the surface light source device according to the first embodiment of the present invention.
Figure 21:
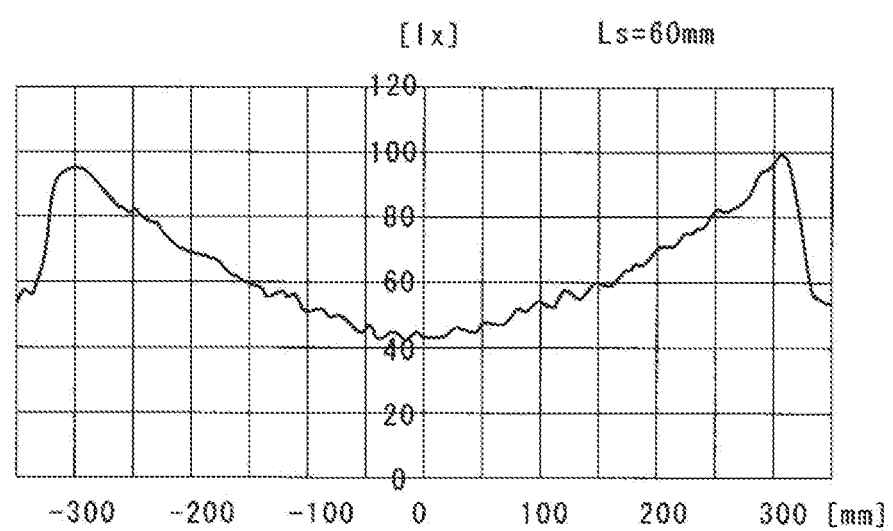
FIG. 21 is an illuminance distribution graph of the illuminated surface in the case where start line Ls of the specular reflection region is set at 60 mm in the surface light source device according to the first embodiment of the present invention.
Figure 22:
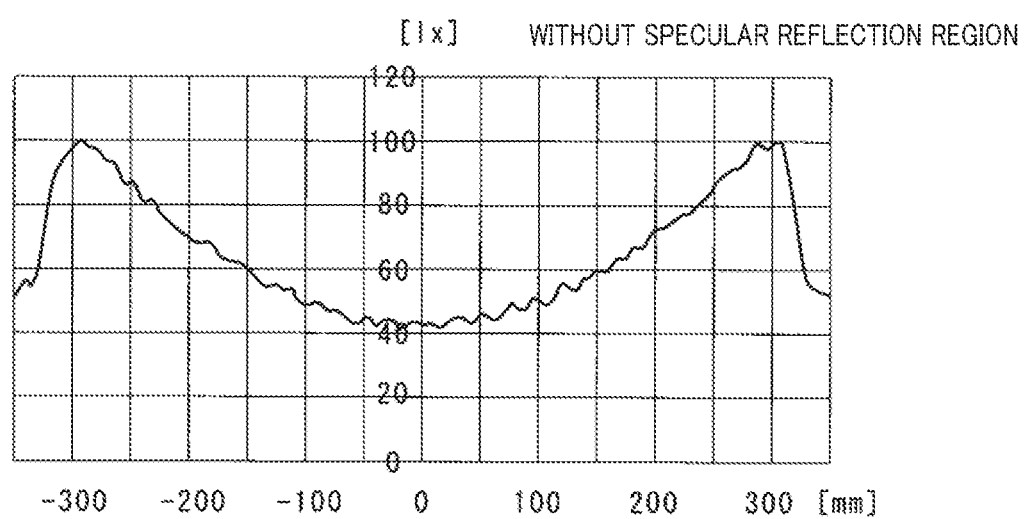
FIG. 22 is a graph illustrating an illuminance distribution on the illuminated surface of the surface light source device according to the first embodiment of the present invention, in the case where the specular reflection region is not provided.

FIG. 7 to FIG. 21 illustrate illuminance distributions (simulations) on illuminated surface 42 which are obtained by changing the position of start line (start edge) Ls of specular reflection region 23 with end line (end edge) Le of specular reflection region 23 fixed at 70 min in surface light source device 1 according to the present embodiment (see FIG. 2B and FIG. 3). In addition, for comparison with the illuminance distributions of FIG. 7 to FIG. 21, FIG. 22 illustrates an illuminance distribution (simulation) on illuminated surface 42 in the case where specular reflection region 23 is not provided. Here, the positions of start line Ls and end line Le are represented by the sizes measured along optical axis 18 of light-emitting element 16 from light emission surface 41 of light-emitting element 16. In addition, illuminated surface 42 is a virtual plane located at the internal surface of roof frame 10 of casing 2. It is to be noted that FIGS. 7 to 21 show the illuminance distributions in respective conditions, specifically, Ls=0 mm in FIG. 7, Ls=10 mm in FIG. 8, Ls=15 mm in FIG. 9, Ls=16 mm in FIG. 10, Ls=18 mm in FIG. 11, Ls=20 mm in FIG. 12, Ls=22 mm in FIG. 13, Ls=24 mm in FIG. 14, Ls=25 mm in FIG. 15, Ls=30 mm in FIG. 16, Ls=35 mm in FIG. 17, Ls=40 mm in FIG. 18, Ls=45 mm in FIG. 19, Ls=50 mm in FIG. 20, and Ls=60 mm in FIG. 21. In addition, in FIG. 7 to FIG. 22, the ordinate represents illuminance [lx]. In addition, in FIG. 7 to FIG. 22, the abscissa represents the distance from center O of illuminated surface 42 in the +X direction (direction along optical axis 18 of light-emitting element 16) and in the −X direction, with center O of illuminated surface 42 set to 0 mm as illustrated in FIG. 5A. The abscissa shows the distance from center O of illuminated surface 42 to light emission surface 41 of light-emitting element 16 (the position of 350 mm and the position of −350 mm) at intervals of 50 mm.

(1) First Example of Start Line of Specular Reflection Region

In order to decrease the brightness in the area near light-emitting devices 14 so as not to stand out in the planar illuminating light emitted from light diffusion plate 3, it is necessary that the brightness in the area near light-emitting devices 14 is equal to or lower than that of the other locations in illuminated surface 42. For this reason, referring to FIG. 7 to FIG. 21, the position of start line Ls of specular reflection region 23 is determined in the range of 0 to 30 mm. In addition, light distribution angle θ at the position of Ls=30 mm was 18.5° where the light distribution angle θ represents an angle between optical axis 18 and light which is emitted from light emission center 16a of light-emitting element 16 and intersects with bottom surface 4, in a virtual plane which includes optical axis 18 of light-emitting element 16 and is orthogonal to bottom surface 4 of casing 2.

Figure 23:
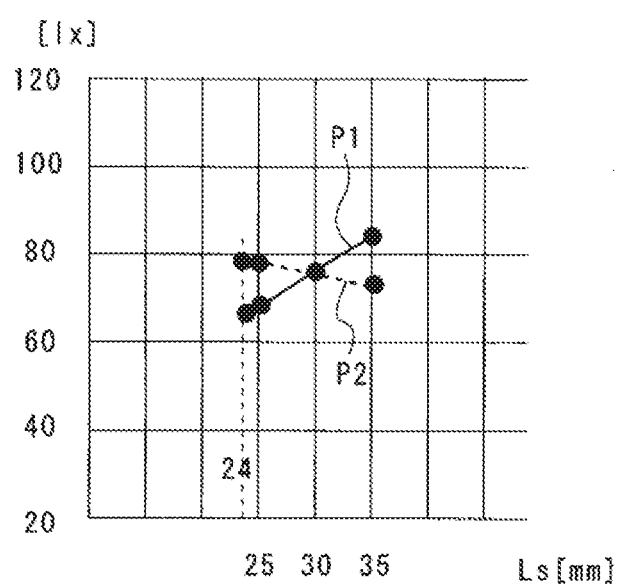
FIG. 23 is a graph for contrasting variations in peak values P1 of the illuminance and variations in peak values P2 of the illuminance on the +X side in FIG. 14 to FIG. 17.
Figure 24:
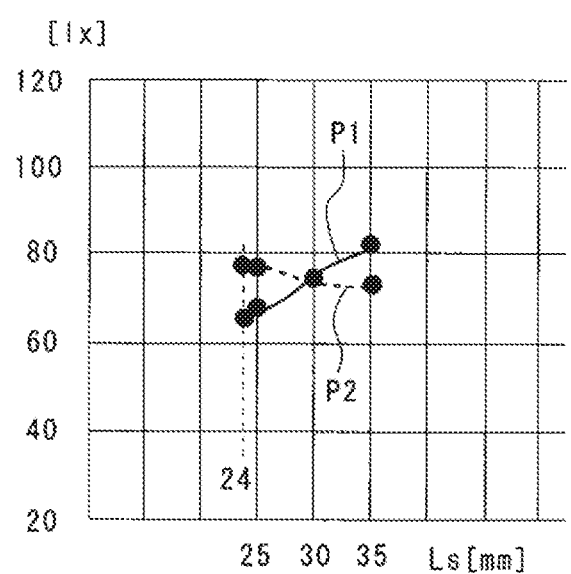
FIG. 24 is a graph for contrasting variations in peak values P1 of the illuminance and variations in peak values P2 of the illuminance on the −X side in FIG. 14 to FIG. 17.

It is to be noted that, in FIG. 14 to FIG. 17 where the position of start line Ls of specular reflection region 23 is set at 24, 25, 30, and 35 mm, two peak values of illuminance (P1 and P2) are generated on each of the +X side and the −X side of the illuminance distribution graph. Here, the peak value of the illuminance in an area near light-emitting devices 14 is represented by P1, and the peak value of the illuminance in an area distant from light emitting devices 14 is represented by P2. FIG. 23 contrasts the variations in peak values P1 of the illuminance and variations in peak values P2 of the illuminance on the +X side in FIG. 14 to FIG. 17 in which the position of start line Ls of specular reflection region 23 is set at 24, 25, 30, and 35 mm. Likewise, FIG. 24 contrasts the variations in peak values P1 of the illuminance and variations in peak values P2 of the illuminance on the −X side in FIG. 14 to FIG. 17 in which the position of start line Ls of specular reflection region 23 is set at 24, 25, 30, and 35 mm. These graphs clearly show that P1=P2 when Ls=30 mm, P2>P1 when Ls<30 mm, and P2<P1 when Ls>30 mm.

From the above, start line Ls of specular reflection region 23 is set at an intersection of light having a distribution angle θ of 18.5° or greater and bottom surface 4. It is to be noted that light distribution angle θ may also be 90° or greater. For example, start line Ls of specular reflection region 23 may also be the internal surface of side walls 5 and 7 on which light-emitting element 16 is attached.

(2) Second Example of Start Line of Specular Reflection Region

In order to decrease the brightness in the area near light-emitting devices 14 so as not to stand out in the planar illuminating light emitted from light diffusion plate 3, it is preferable that there be no or only a small amount of bright and dark contrast in the illuminance distribution in an area near light-emitting devices 14 on illuminated surface 42. In the technical field to which surface light source device 1 according to the present embodiment pertains, an object is to suppress amplitude, which represents bright and dark contrast in an illuminance distribution, to 2.0 or less. Here, amplitude (S) is expressed as S={P1−(P1−B)/2}/(P1−B)/2× 100, where the minimum illuminance value between illuminance peak values P1 and P2 on illuminated surface 42 is presented by B.

Figure 25:
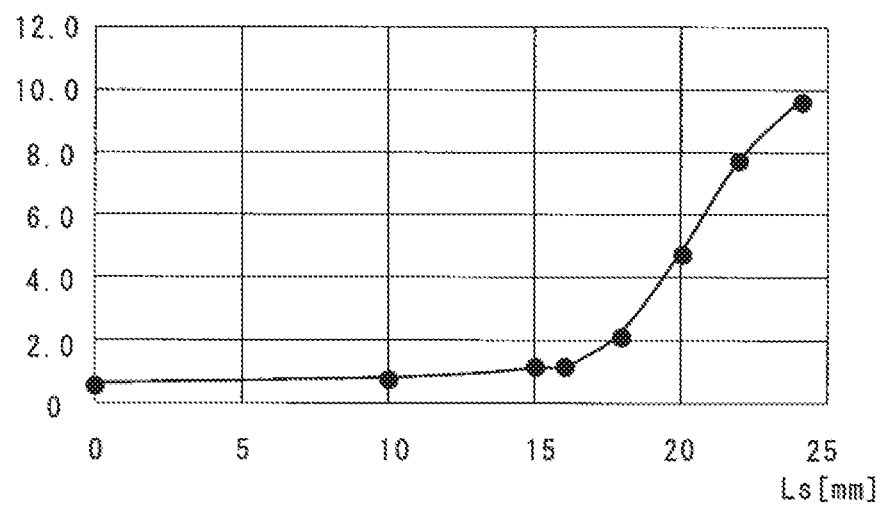
FIG. 25 is a graph illustrating variations in amplitude (S) obtained from the illuminance distributions (illuminance distributions in FIG. 7 to FIG. 14) in which the positions of start line Ls of specular reflection region 23 is set at 0, 10, 15, 16, 18, 20, 22, and 24 mm in the surface light source device according to the first embodiment of the present invention.

FIG. 25 is a graph illustrating variations in amplitude (S) obtained from the illuminance distributions (illuminance distributions in FIG. 7 to FIG. 14) in which the position of start line Ls of specular reflection region 23 is set at 0, 10, 15, 16, 18, 20, 22, and 24 mm.

As illustrated in FIG. 25, the amplitude is equal to or lower than 2 when the position of start line Ls of specular reflection region 23 is equal to or smaller than 17.5 mm. As is clear from the comparison between FIG. 11 where the position of start line Ls of specular reflection region 23 is 18 mm and FIG. 16 where the position of start line Ls of specular reflection region 23 is 30 mm, when the position of start line Ls of specular reflection region 23 is 17.5 mm, the brightness in the area near light-emitting devices 14 can be decreased more effectively than the above-described first example. Here, when the position of start line Ls is 17.5 mm, light distribution angle θ is 30.5°.

From the above, start line Ls of specular reflection region 23 is set at an intersection of light having a distribution angle θ of 30.5° or greater and bottom surface 4. It is to be noted that light distribution angle θ may also be 90° or greater. For example, start line Ls of specular reflection region 23 may also be the internal surface of side walls 5 and 7 on which light-emitting element 16 is attached.

(Determination of Position of End line (End Edge) of Specular Reflection Region)

Figure 26:
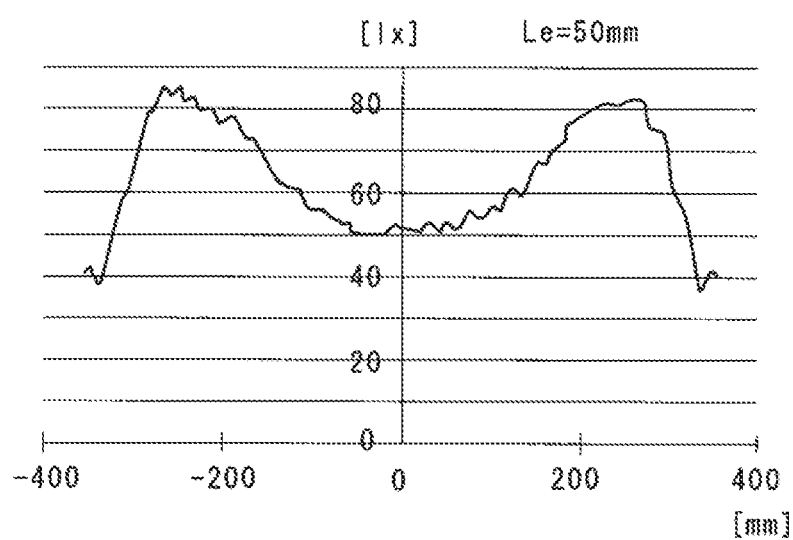
FIG. 26 is an illuminance distribution graph of the illuminated surface in the case where end line Le of the specular reflection region is set at 50 mm in the surface light source device according to the first embodiment of the present invention.
Figure 27:
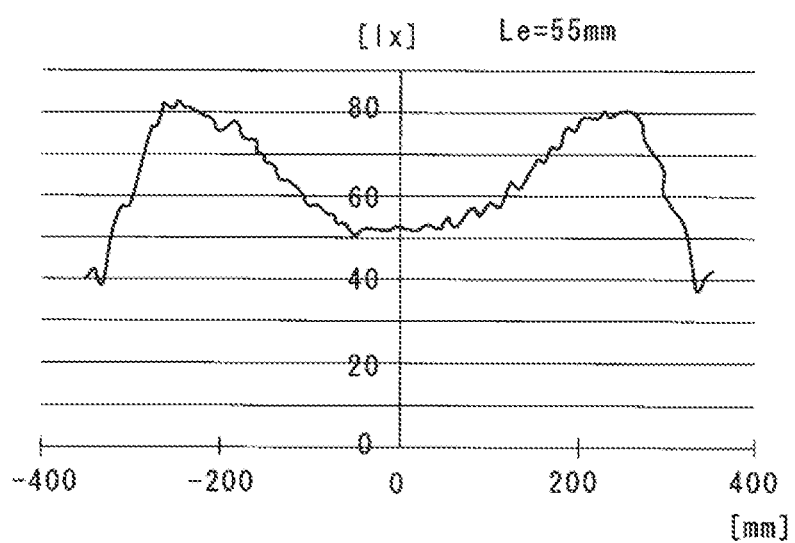
FIG. 27 is an illuminance distribution graph of the illuminated surface in the case where end line Le of the specular reflection region is set at 55 mm in the surface light source device according to the first embodiment of the present invention.
Figure 28:
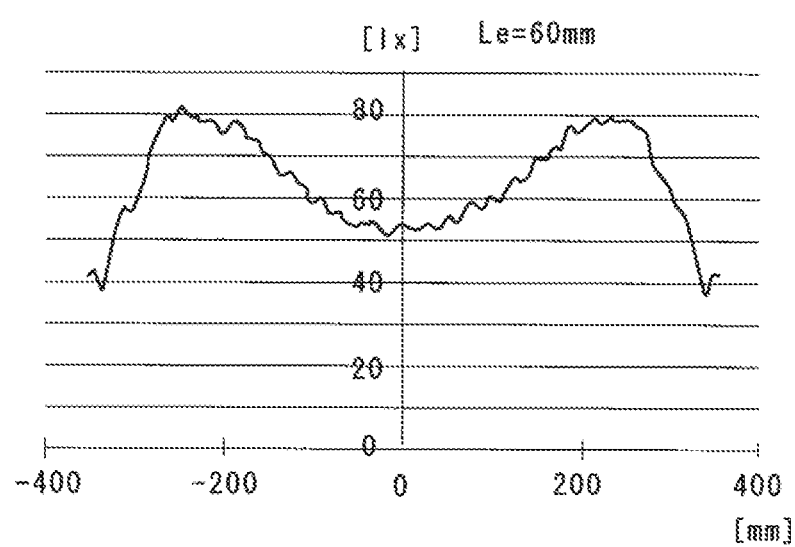
FIG. 28 is an illuminance distribution graph of the illuminated surface in the case where end line Le of the specular reflection region is set at 60 mm in the surface light source device according to the first embodiment of the present invention.
Figure 29:
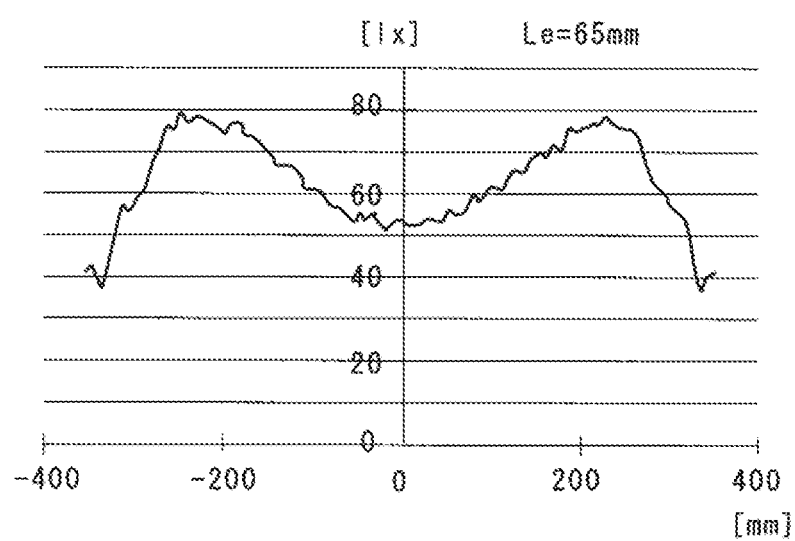
FIG. 29 is an illuminance distribution graph of the illuminated surface in the case where end line Le of the specular reflection region is set at 65 mm in the surface light source device according to the first embodiment of the present invention.
Figure 30:
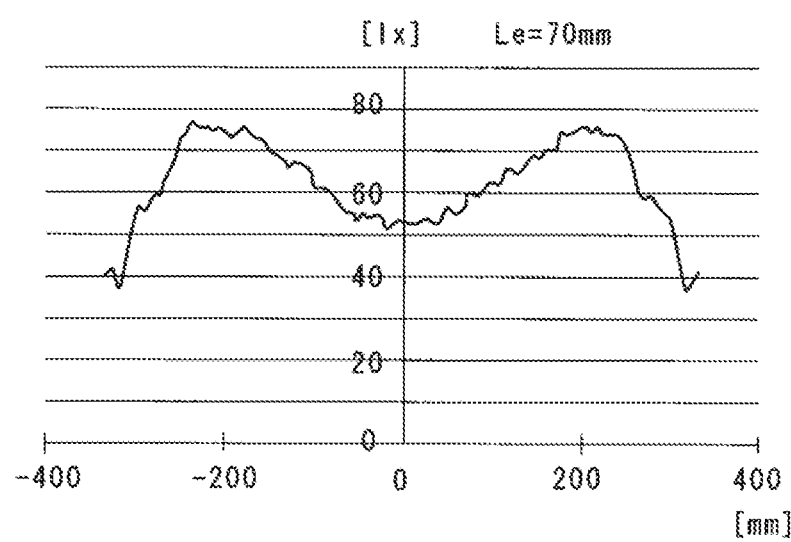
FIG. 30 is an illuminance distribution graph of the illuminated surface in the case where end line Le of the specular reflection region is set at 70 mm in the surface light source device according to the first embodiment of the present invention.
Figure 31:
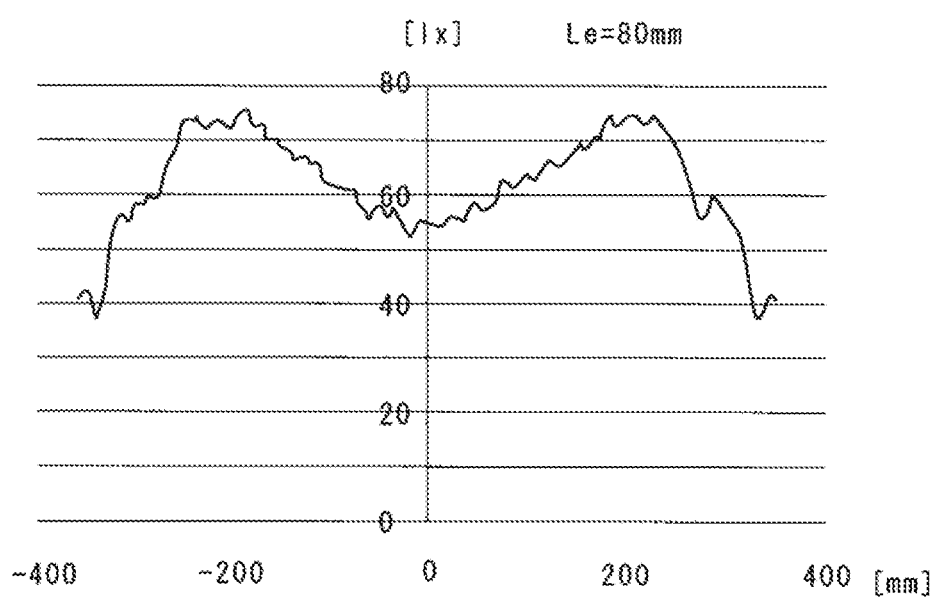
FIG. 31 is an illuminance distribution graph of the illuminated surface in the case where end line Le of the specular reflection region is set at 80 mm in the surface light source device according to the first embodiment of the present invention.
Figure 32:
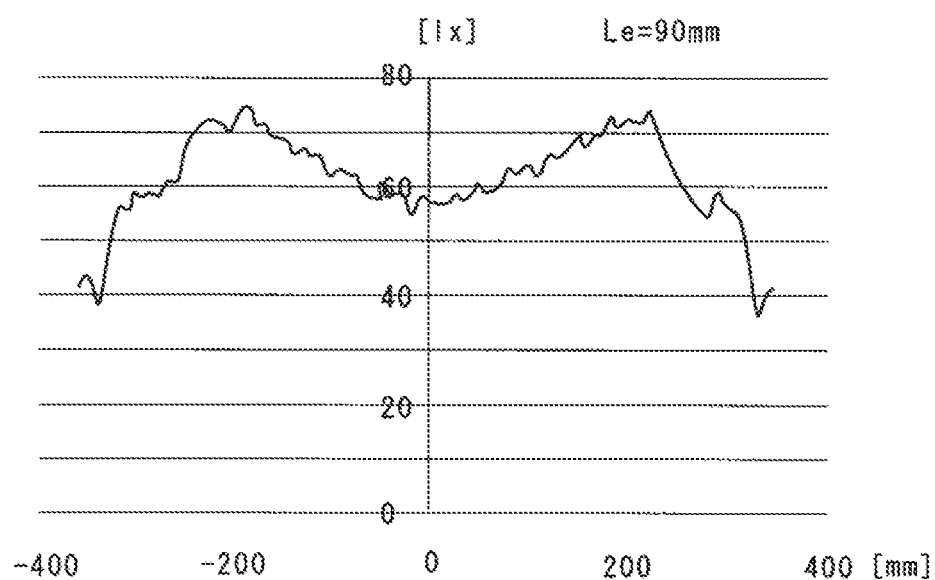
FIG. 32 is an illuminance distribution graph of the illuminated surface in the case where end line Le of the specular reflection region is set at 90 mm in the surface light source device according to the first embodiment of the present invention.
Figure 33:
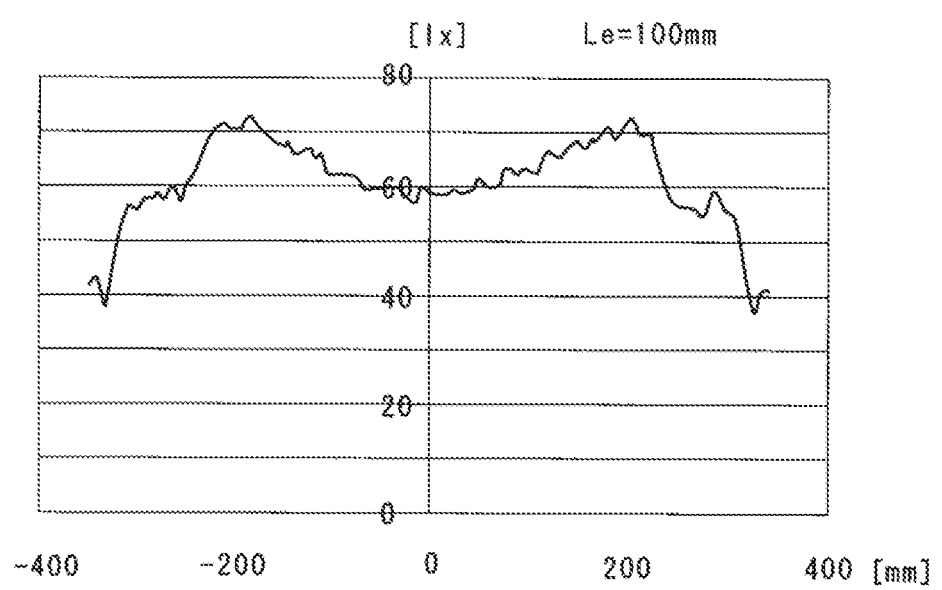
FIG. 33 is an illuminance distribution graph of the illuminated surface in the case where end line Le of the specular reflection region is set at 100 mm in the surface light source device according to the first embodiment of the present invention.
Figure 34:
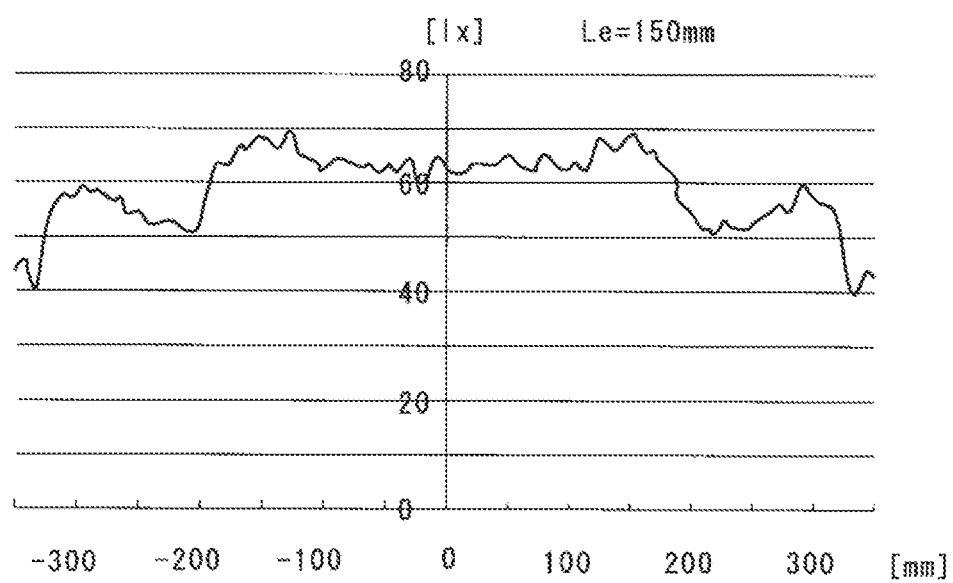
FIG. 34 is an illuminance distribution graph of the illuminated surface in the case where end line Le of the specular reflection region is set at 150 mm in the surface light source device according to the first embodiment of the present invention.
Figure 35:
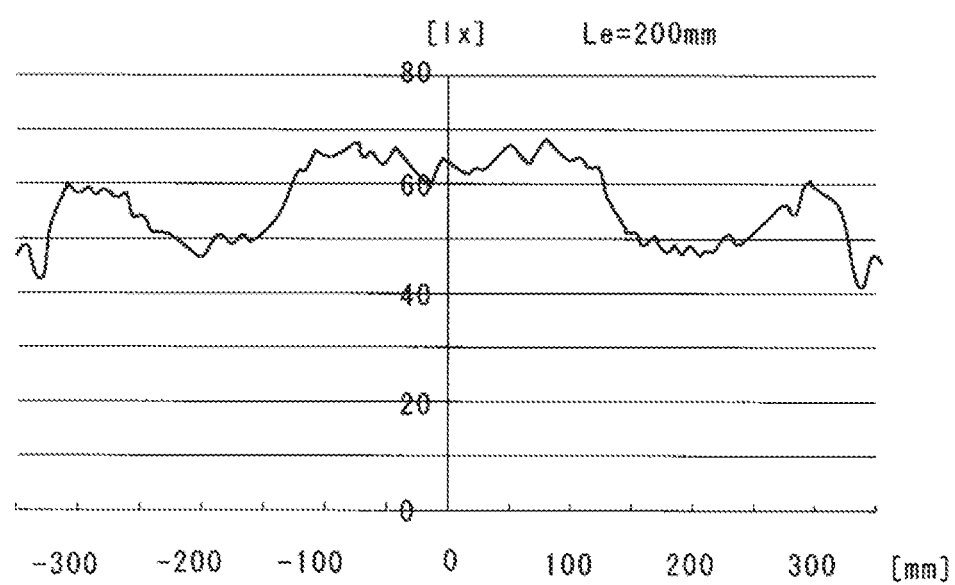
FIG. 35 is an illuminance distribution graph of the illuminated surface in the case where end line Le of the specular reflection region is set at 200 mm in the surface light source device according to the first embodiment of the present invention.
Figure 36:
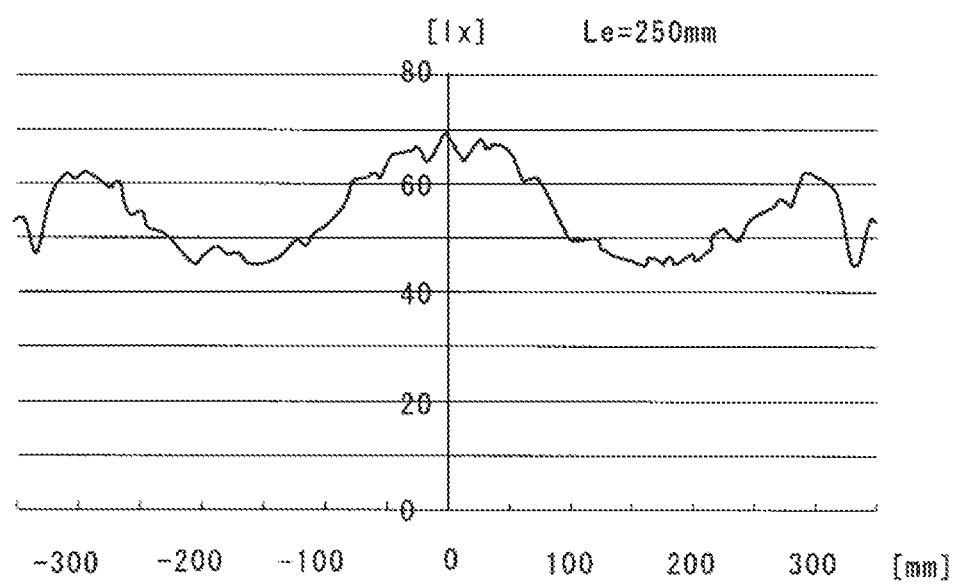
FIG. 36 is an illuminance distribution graph of the illuminated surface in the case where end line Le of the specular reflection region is set at 250 mm in the surface light source device according to the first embodiment of the present invention.
Figure 37:
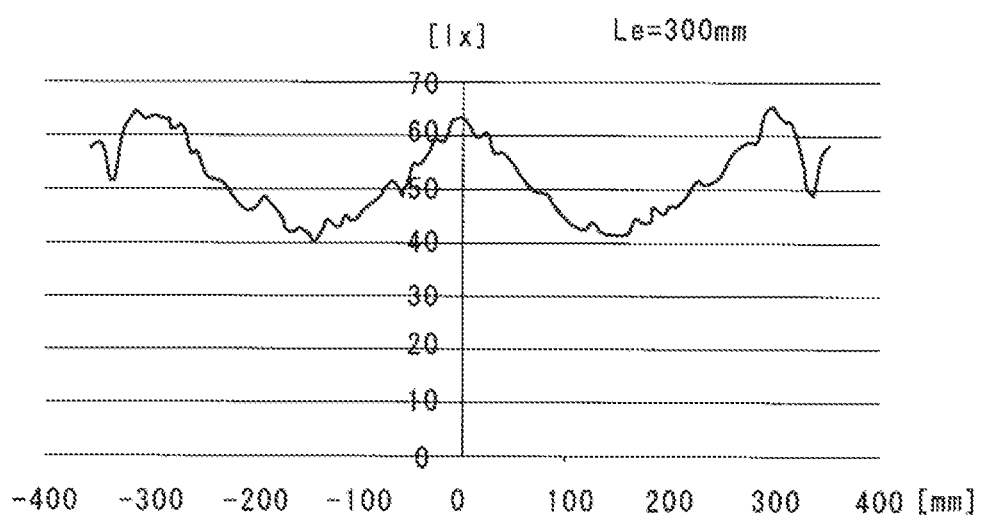
FIG. 37 is an illuminance distribution graph of the illuminated surface in the case where end line Le of the specular reflection region is set at 300 mm in the surface light source device according to the first embodiment of the present invention.
Figure 38:
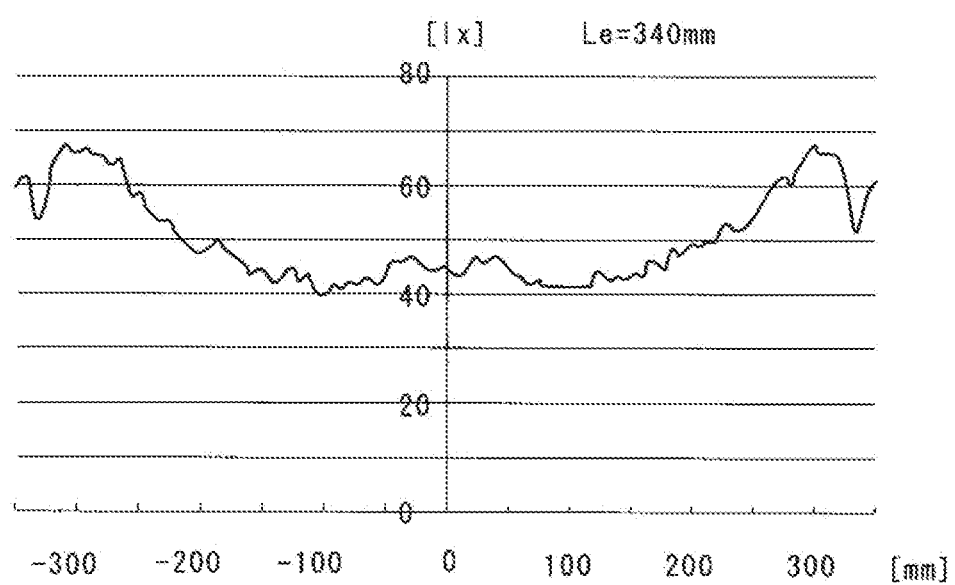
FIG. 38 is an illuminance distribution graph of the illuminated surface in the case where end line Le of the specular reflection region is set at 340 mm in the surface light source device according to the first embodiment of the present invention.
Figure 39:
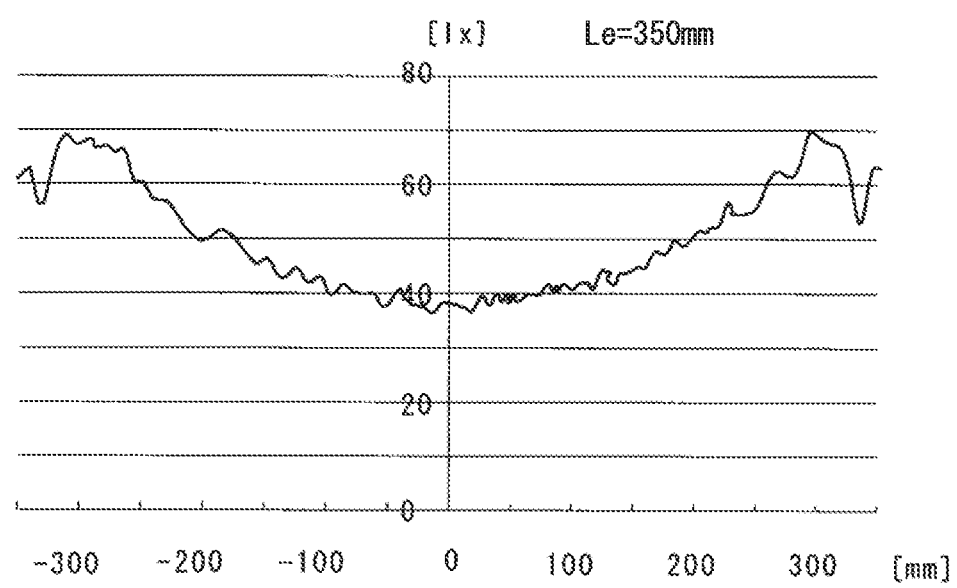
FIG. 39 is an illuminance distribution graph of the illuminated surface in the case where end line Le of the specular reflection region is set at 350 mm in the surface light source device according to the first embodiment of the present invention.

FIG. 26 to FIG. 39 illustrate illuminance distributions (simulations) on illuminated surface 42 which are obtained by changing the position of end line Le of specular reflection region 23 with start line (start edge) Ls of specular reflection region 23 fixed at 0 mm in surface light source device 1 according to the present embodiment (see FIG. 5). In addition, for comparison with the illuminance distributions of FIG. 26 to FIG. 39, FIG. 40 illustrates an illuminance distribution (simulation) on illuminated surface 42 in the case where specular reflection region 23 is not provided. It is to be noted that FIG. 26 to FIG. 39 show the illuminance distributions in respective conditions, specifically, Le=50 mm in FIG. 26, Le=55 mm in FIG. 27, Le=60 mm in FIG. 28, Le=65 mm in FIG. 29, Le=70 mm in FIG. 30, Le=80 mm in FIG. 31, Le=90 mm in FIG. 32, Le=100 mm in FIG. 33, Le=150 mm in FIG. 34, Le=200 mm in FIG. 35, Le=250 mm in FIG. 36, Le=300 mm in FIG. 37, Le=340 mm in FIG. 38, and Le=350 mm in FIG. 39. In addition, in FIG. 26 to FIG. 40, the ordinate represents illuminance [lx]. In addition, in FIG. 26 to FIG. 40, the abscissa represents the distance from center O of illuminated surface 42 in the +X direction (direction along optical axis 18 of light-emitting element 16) and in the −X direction with center O of illuminated surface 42 set to 0 mm as illustrated in FIG. 5A. The abscissa shows the distance from center O of illuminated surface 42 to light emission surface 41 of light-emitting element 16 (the position of 350 mm and the position of −350 mm) at intervals of 100 mm.

Figure 40:
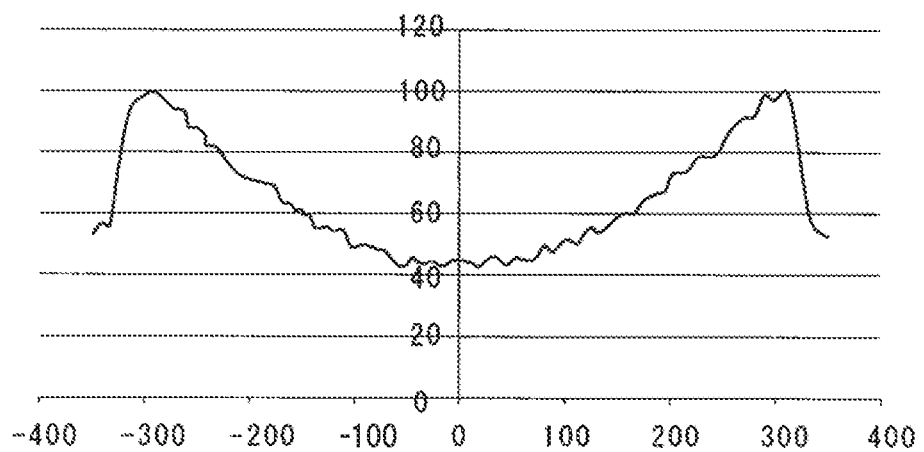
FIG. 40 is a graph illustrating an illuminance distribution on the illuminated surface in the case where the specular reflection region is not provided in the surface light source device according to the first embodiment of the present invention.
Figure 41:
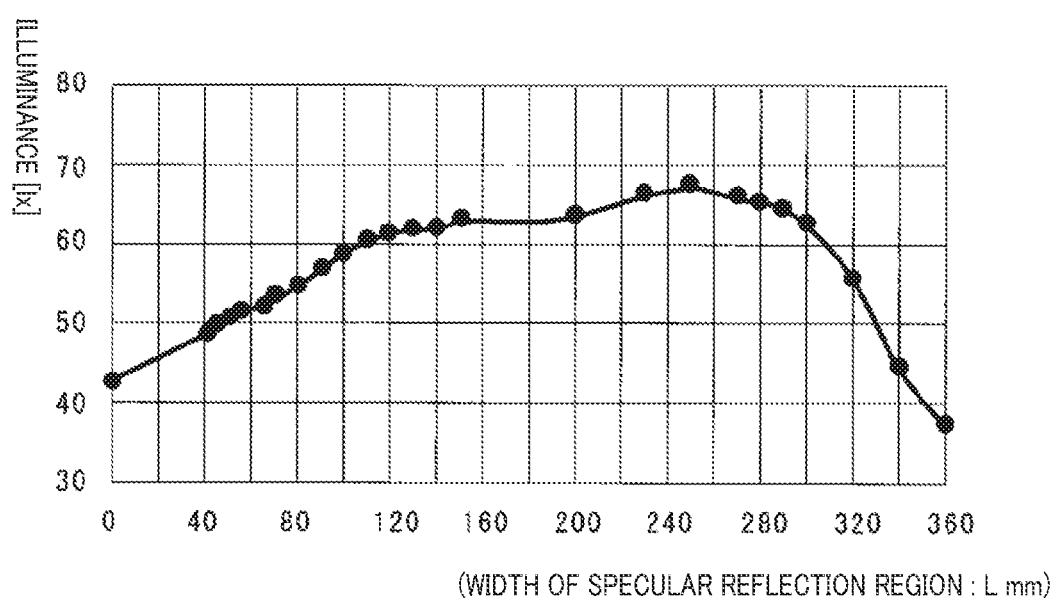
FIG. 41 collectively illustrates the relationship between the position of end line Le of the specular reflection region and the illuminance at a center of the illuminated surface in the surface light source device according to the first embodiment of the present invention, based on data of FIG. 26 to FIG. 40.

In order to improve illumination quality by suppressing luminance unevenness of the planar illuminating light emitted from light diffusion plate 3 in surface light source device 1 of the present embodiment, it is necessary to decrease non-uniformity of illuminance on illuminated surface 42 by increasing the illuminance at center O of illuminated surface 42 in comparison with the case where specular reflection region 23 is not provided (FIG. 40). In view of this, as illustrated in FIG. 41, the relationships between the position of end line Le of specular reflection region 23 and the illuminance at center O of illuminated surface 42 are collected from the data of FIG. 26 to FIG. 40. In FIG. 41, when specular reflection region 23 is not provided as in FIG. 40, the position of end line Le of specular reflection region 23 is 0 mm. In addition, the value of the position of end line Le of specular reflection region 23 represents width L of specular reflection region 23 from start line Ls of specular reflection region 23 to end line Le of specular reflection region 23 (see FIG. 5).

Referring to FIG. 41, when end line Le of specular reflection region 23 is set at 250 mm, the illuminance at center O of illuminated surface 42 is maximized. In addition, referring to FIG. 41, at least when the position of end line Le of specular reflection region 23 is in the range of 340 mm or smaller, the illuminance at center O of illuminated surface 42 is greater than that in the case where specular reflection region 23 is not provided (Le=0 mm). However, referring to FIG. 41, when the position of end line Le of specular reflection region 23 is greater than 250 mm, the illuminance at center O of illuminated surface 42 decreases. Accordingly, in consideration of the material cost of second reflection member 22 making up specular reflection region 23 and the effect obtained by providing specular reflection region 23, the position of end line Le of specular reflection region 23 is set at 250 mm or smaller. In addition, light distribution angle θ at the position of Le=250 mm was 2°, where the light distribution angle θ represents an angle between optical axis 18 and light which is emitted from light emission center 16a of light-emitting element 16 and intersects with specular reflection region 23 in a virtual plane which includes optical axis 18 of light-emitting element 16 and is orthogonal to bottom surface 4 of casing 2.

Given the above, in surface light source device 1 of the present embodiment, it is preferable to set end line Le of specular reflection region 23 at a position inside the intersection of light having a light distribution angle θ of 2° and specular reflection region 23.

It is to be noted that, in order to obtain the effect of increasing the illuminance at the center of illuminated surface 42 in comparison with the illuminance in the case where specular reflection region 23 is not formed when start line Ls is set at a position inside the intersection of light of θ≥18.5° and bottom surface 4, or when start line Ls is set at a position inside the intersection of light of θ≥30.5° and bottom surface 4, it is only necessary to set end line Le at a position inside the intersection of light of (light distribution angle θ of light which reaches the position of Ls)>θ≥2° and bottom surface 4.

With this rule, the length of specular reflection region 23 (the distance from Ls to Le) may be extremely short. Here, with reference to the results in FIG. 7 to FIG. 21 which have been used for determining start line Ls, the effect of decreasing the brightness of light in the area near light-emitting devices 14 can be confirmed in the range of Ls≤50 mm (Le=70 mm), that is, when the length of specular reflection region 23 is in the range of 20 mm or greater. Accordingly, in order to achieve the effect of specular reflection region 23, it is preferable to set the length of specular reflection region 23 at 20 mm or greater in addition to the above-described rule of the position of Ls and Le.

(Function and Effect of Surface light source Device According to the Present Embodiment)

As described, according to surface light source device 1 of the present embodiment, specular reflection region 23 of reflection member 20 disposed on bottom surface 4 of casing 2 reflects light emitted from light-emitting devices 14 (specular-reflects the light without absorbing the light) in a direction away from light-emitting devices 14, whereby the illuminance in an area near light-emitting devices 14 on illuminated surface 42 can be decreased to a low level and the illuminance at center O of illuminated surface 42 can be increased. As a result, surface light source device 1 of the present embodiment can decrease the brightness of the planar illuminating light emitted from light diffusion plate 3 in the area near light-emitting devices 14 and can increase the brightness of the planar illuminating light emitted from light diffusion plate 3 at center O, and therefore, can achieve bright and uniform planar illumination by suppressing luminance unevenness of emitted light, without decreasing use efficiency of light.

(Modification of Light flux Controlling Member)

Figure 42A:
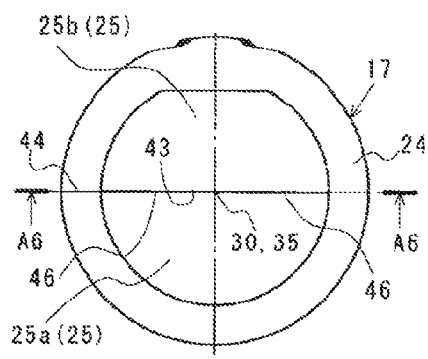
FIG. 42A is a plan view of a modification of the light flux controlling member.
Figure 42E:
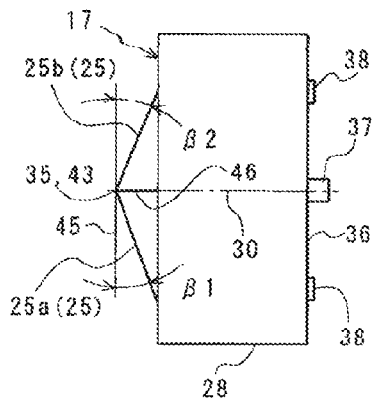
FIG. 42E is a side view of the light flux controlling member.
Figure 42B:
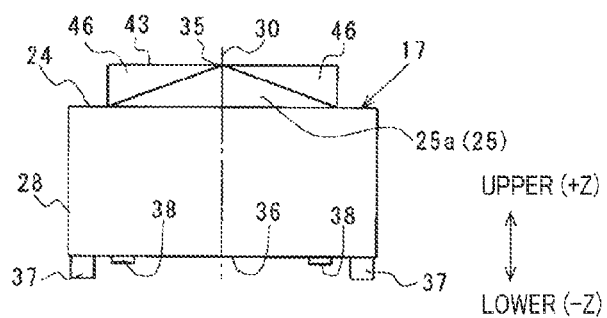
FIG. 42B is a front view of a modification of the light flux controlling member.
Figure 42C:
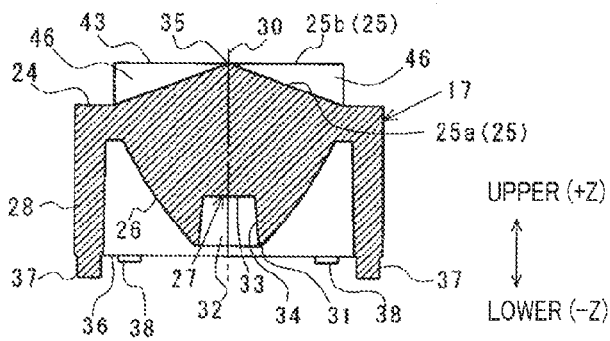
FIG. 42C is a cross-sectional view of the light flux controlling member of FIG. 42A taken along line A6-A6.
Figure 42D:
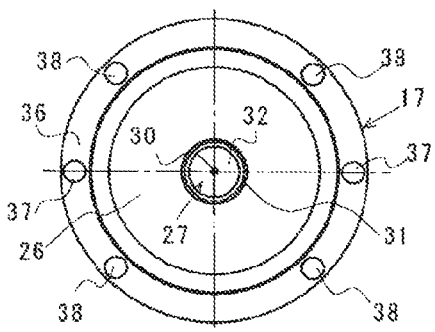
FIG. 42D is a bottom view of the light flux controlling member.

FIGS. 42A to 42E illustrate a modification of light flux controlling member 17. Light flux controlling member 17 according to the present modification illustrated in FIG. 42 is used in place of light flux controlling member 17 illustrated in FIG. 2B and FIGS. 6A to 6D. FIG. 42A is a plan view of light flux controlling member 17, FIG. 42B is a front view of light flux controlling member 17, FIG. 42C is a cross-sectional view of light flux controlling member 17 of FIG. 42A taken along line A6-A6, FIG. 42D is a bottom view of light flux controlling member 17, and FIG. 42E is a side view of light flux controlling member 17.

Similarly to light flux controlling member 17 illustrated in FIG. 6, light flux controlling member 17 according to the modification is made of, for example, a transparent resin material such as PMMA (polymethylmethacrylate), PC (polycarbonate), EP (epoxy resin) or transparent glass. In light flux controlling member 17, emission surface 25 is formed on the top surface side of ring-shaped flange 24, and total reflection surface 26 and incident surface 27 are formed on the bottom surface side of flange 24. In addition, on the lower side of the external periphery of flange 24, cylindrical holder section 28 is formed so as to surround total reflection surface 26. Light flux controlling member 17 is attached to substrate 15 on which light-emitting element 16 is mounted, in such a manner that central axis 30 is positioned coaxially with optical axis 18 of light-emitting element 16 (see FIG. 2B).

Incident surface 27 is the internal surface of recess 32 formed on rear surface 31 side of light flux controlling member 17. The cross-sectional shape of incident surface 27 is an isosceles trapezoid shape, and incident surface 27 is rotationally symmetrical about central axis 30. Incident surface 27 includes first incident surface 33 which is the bottom surface of recess 32, and second incident surface 34 which is a tapered cylindrical surface extending from first incident surface 33 to the edge of the opening of recess 32. Here, the inner diameter of second incident surface 34 gradually increases toward the edge of the opening from first incident surface 33 such that the inner diameter of the edge of the opening is greater than the inner diameter of the edge on first incident surface 33 side. It is to be noted that rear surface 31 of light flux controlling member 17 is a ring-shaped plane formed around the edge of the opening of recess 32, and is a plane positioned on a virtual plane orthogonal to central axis 30.

Total reflection surface 26 is the exterior surface extending from the external peripheral edge of rear surface 31 to the bottom surface of flange 24. Total reflection surface 26 is a rotationally symmetrical surface (exterior surface having a substantially truncated cone shape) formed so as to surround central axis 30. The outer diameter of total reflection surface 26 gradually increases from rear surface 31 toward flange 24. In addition, the generatrix of total reflection surface 26 is an arc-shaped curve which protrudes outwardly (in the direction away from central axis 30) (see FIG. 42C).

Emission surface 25 includes first emission surface 25a disposed on bottom surface 4 side relative to central axis 30 (optical axis 18), and second emission surface 25b disposed at a position distant from bottom surface 4 relative to first emission surface 25a (see FIG. 2B). First emission surface 25a is a substantially half cone shaped aspherical surface formed in the range of 180° around central axis 30. First emission surface 25a is a half cone surface which is formed by turning a generatrix, which is a line of intersection of first emission surface 25a and a virtual cross-section which is orthogonal to bottom surface 4 and includes central axis 30, about central axis 30 in an angle range of ±90°. First emission surface 25a is so formed that vertex 35 is located on central axis 30, and that the maximum diameter of the lower edge (edge on flange 24) thereof is equal to or greater than the maximum diameter of total reflection surface 26. In addition, second emission surface 25b is an inclined surface which is so formed that upper end edge (top side) 43 along center line 44 has the same height as vertex 35 of first emission surface 25a, and that the height (height in the direction along central axis 30 from the top surface of flange 24) gradually decreases in the direction orthogonal to center line 44. Second emission surface 25b is formed around central axis 30 in an angle range of 180°. Here, angle β2 between virtual plane 45 orthogonal to central axis 30 and second emission surface 25b is greater than angle β1 between the generatrix of first emission surface 25a and virtual plane 45 orthogonal to central axis 30 (β2>β1). In addition, second emission surface 25b is divided from first emission surface 25a by center line 44 orthogonal to central axis 30 when emission surface 25 is viewed in plan. It is to be noted that first emission surface 25a and second emission surface 25b are connected by a pair of upright walls 46, 46 that are line-symmetric about central axis 30. As illustrated in FIGS. 42B and C, upright wall 46 has a triangular shape in front view, and is raised along central axis 30 from first emission surface 25a to second emission surface 25b. From upright wall 46, part of light which has not been emitted from first emission surface 25a and second emission surface 25b is emitted.

In light flux controlling member 17 having the above-mentioned structure, of the light from light-emitting element 16, light coming through first incident surface 33 directly reaches first emission surface 25a and second emission surface 25b, while light coming through second incident surface 34 is totally reflected and collected by total reflection surface 26 and then reaches first emission surface 25a and second emission surface 25b. Then, first emission surface 25a and second emission surface 25b emit the light from light-emitting element 16 toward internal space 11 of casing 2 (see FIG. 2B). In addition, upright walls 46, 46 emit part of the light from light-emitting element 16 which has not been emitted from first emission surface 25a and second emission surface 25b. Thus, in the light from light-emitting element 16 emitted by light flux controlling member 17, the amount of light on bottom surface 4 side relative to optical axis 30 is greater than that of light on light diffusion plate 3 side relative to optical axis 30. Accordingly, the amount of light reflected by specular reflection region 23 of reflection member 20 increases in comparison with the case where light flux controlling member 17 of FIGS. 6A to 6D is used. As a result, in comparison with surface light source device 1 using light flux controlling member 17 illustrated in FIGS. 6A to 6D, surface light source device 1 using light flux controlling member 17 according to the present modification can further increase the brightness of the planar illuminating light emitted from light diffusion plate 3 in an area distant from light-emitting devices 14.

It is to be noted that angle β2 between virtual plane 45 orthogonal to central axis 30 and second emission surface 25b may also be equal to or slightly smaller than angle β1 between virtual plane 45 orthogonal to central axis 30 and the generatrix of first emission surface 25a (β2=β1).

(Display)

As illustrated in FIG. 2A and FIG. 2B, in display 50, illuminated member (a liquid crystal display panel, an advertisement plate or the like) 51 is disposed in an overlapping relationship on light diffusion plate 3 of surface light source device 1. Display 50 can illuminate illuminated member 51 by planar illuminating light emitted from light diffusion plate 3 of surface light source device 1.

[Second Embodiment]

Figure 43A:
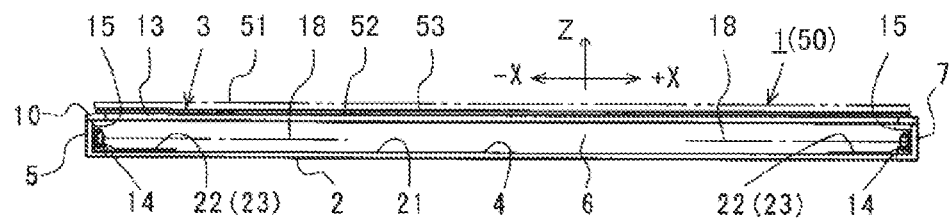
FIG. 43A is a cross-sectional view illustrating a surface light source device according to a second embodiment of the present invention and corresponding to FIG. 2A.
Figure 43B:
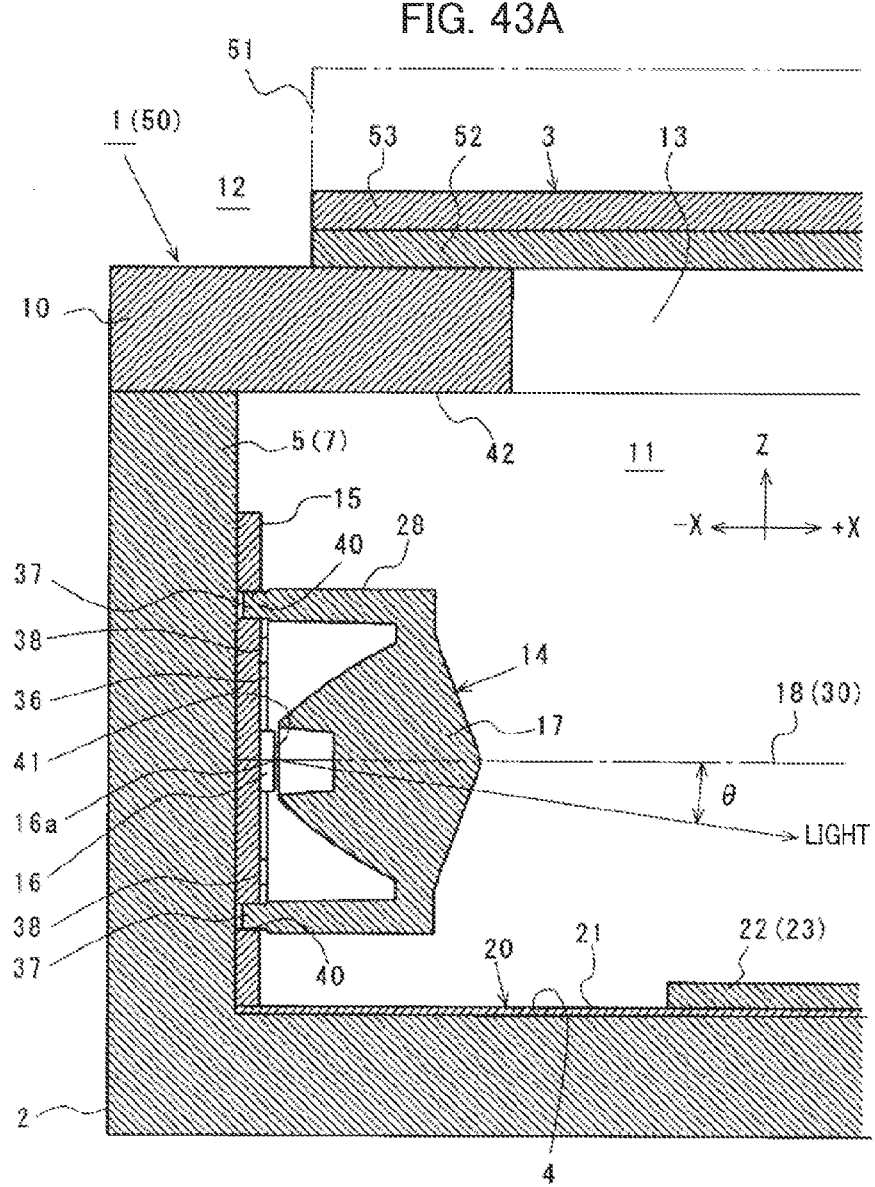
FIG. 43B is an enlarged cross-sectional view illustrating a part of the surface light source device according to the second embodiment of the present invention and corresponding to FIG. 2B.
Figure 44:
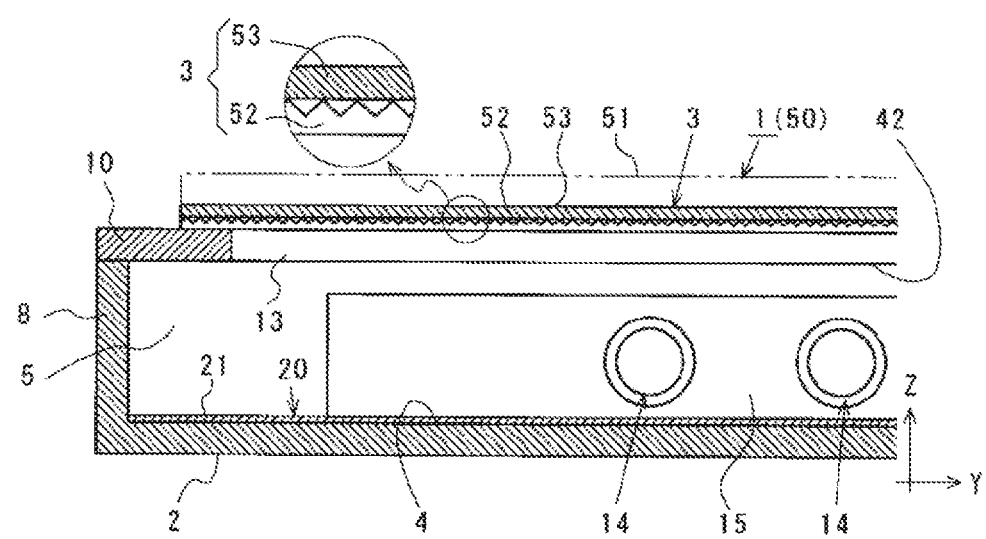
FIG. 44 is an enlarged view illustrating a part of the surface light source device according to the second embodiment of the present invention and corresponding to FIG. 3.

FIGS. 43A and 43B and FIG. 44 illustrate surface light source device 1 according to the second embodiment of the present invention. FIG. 43A is a cross-sectional view illustrating surface light source device 1 and corresponding to FIG. 2A. FIG. 43B is an enlarged cross-sectional view illustrating a part of surface light source device 1 and corresponding to FIG. 2B. FIG. 44 is an enlarged view illustrating a part of the surface light source device and corresponding to FIG. 3. It should be noted that, in surface light source device 1 according to the present embodiment, components corresponding to those of surface light source device 1 according to the first embodiment are denoted by the same reference numerals, and the description overlapping the description of surface light source device 1 according to the first embodiment is omitted.

As illustrated in FIGS. 43A and 43B and FIG. 44, in surface light source device 1 according to the present embodiment, light diffusion plate 3 includes prism sheet 52 that covers opening 13 of casing 2, and light diffusion sheet 53 disposed in an overlapping relation on prism sheet 52.

Prism sheet 52 is made of a highly light-transmissive synthetic resin material (such as PET, PMMA, and PC) and has a rectangular shape in plan view. Prism sheet 52 is provided with a plurality of grooves (prism grooves) 54 each having a substantially triangular shape in cross-section and extending along optical axis 18 of light-emitting element 16. Grooves 54 are formed along the direction orthogonal to optical axis 18. In prism sheet 52, inclined surfaces defining grooves 54 retro-reflect part of light incident on prism sheet 52 and bring the light back to internal space 11, thereby exercising a light guiding function for the light in internal space 11. In addition, prism sheet 52 is so disposed that grooves 54 face light diffusion sheet 53.

Light diffusion sheet 53 is made of a highly light-transmissive synthetic resin material (such as PET, PMMA, and PC) and has a rectangular shape in plan view. Light diffusion sheet 53 is subjected to a conventionally known light diffusion treatment and thus has a light diffusion function of diffusing light while allowing the light to pass therethrough. Light diffusion sheet 53 diffuses light passing through prism sheet 52 while allowing the light to pass therethrough.

Since prism sheet 52 that exercises a light guiding function is provided, surface light source device 1 according to the present embodiment as described above can guide light emitted from light-emitting devices 14 to a location remote from light-emitting devices 14 in comparison with surface light source device 1 according to the first embodiment having no prism sheet 52. Therefore, when the light reflection function in specular reflection region 23 of reflection member 20 is excessive, surface light source device 1 according to the present embodiment excessively decrease the illuminance in the area near light-emitting devices 14 on illuminated surface 42 and excessively increase the illuminance at the center of illuminated surface 42, and as a result, the bright and dark contrast of planar illuminating light emitted from light diffusion plate 3 is increased between the area near light-emitting devices 14 and the center, thus degrading illumination quality. In view of this, width L with which specular reflection region 23 of reflection member 20 to be used in combination with prism sheet 52 in surface light source device 1 of the present embodiment does not cause degradation in illumination quality, that is, a preferable position of end line Le of specular reflection region 23, will be reconsidered as follows.

(Determination of End Line (End Edge) of Specular Reflection Region)

FIG. 45 to FIG. 54 illustrate, by solid lines, illuminance distributions (simulations) on illuminated surface 42 which are obtained by changing the position of end line Le of specular reflection region 23 with the position of start line (start edge) Ls of specular reflection region 23 fixed at 0 mm in surface light source device 1 according to the present embodiment. In addition, in FIG. 45 to FIG. 54, the illuminance distributions designated by dotted lines indicate illuminance distributions (simulations) on illuminated surface 42 in surface light source device 1 (provided with no prism sheet 52) according to the first embodiment, for comparison with illuminance distributions on illuminated surface 42 in surface light source device 1 according to the present embodiment.

Figure 45:
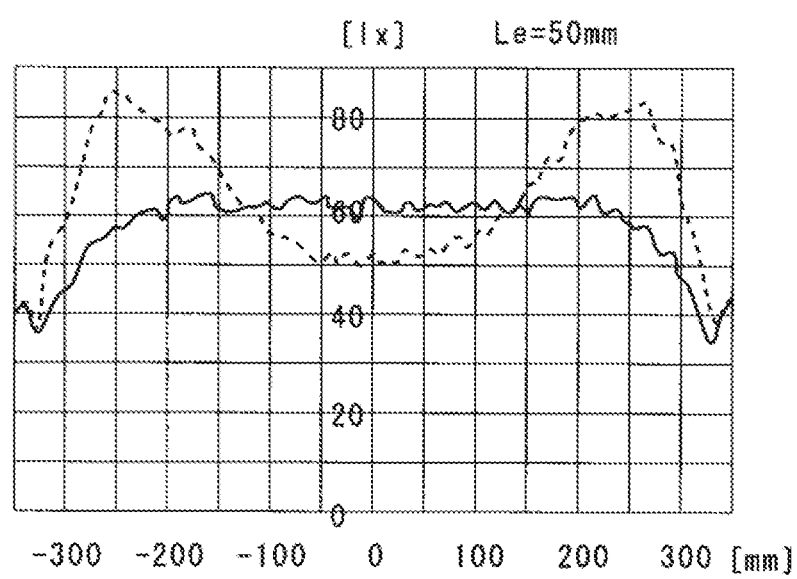
FIG. 45 is a graph for contrasting the illuminance distribution of the surface light source device according to the second embodiment and the illuminance distribution of the surface light source device according to the first embodiment of the present invention, in the case where end line Le of the specular reflection region is set at 50 mm.
Figure 46:
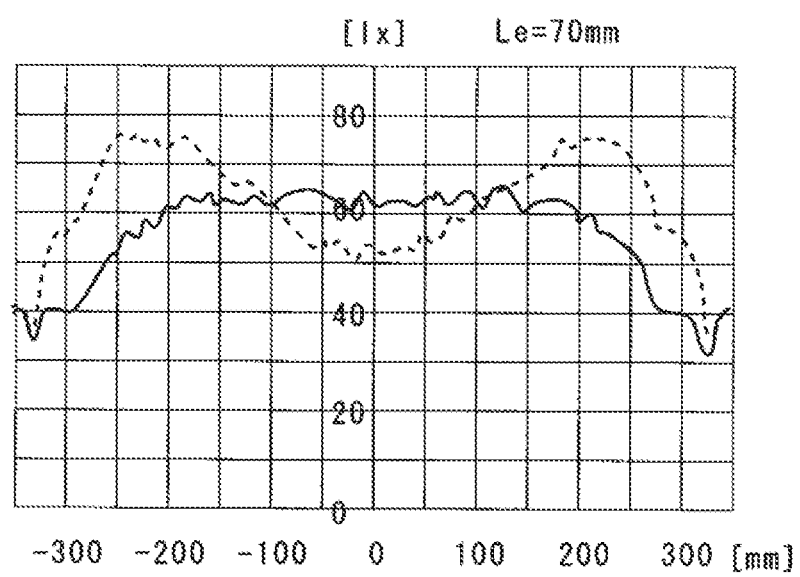
FIG. 46 is a graph for contrasting the illuminance distribution of the surface light source device according to the second embodiment and the illuminance distribution of the surface light source device according to the first embodiment of the present invention, in the case where end line Le of the specular reflection region is set at 70 mm.
Figure 47:
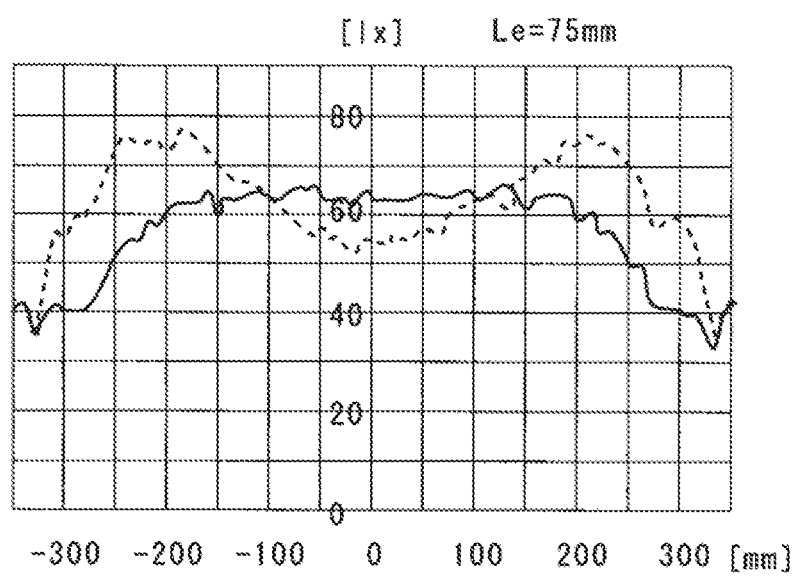
FIG. 47 is a graph for contrasting the illuminance distribution of the surface light source device according to the second embodiment and the illuminance distribution of the surface light source device according to the first embodiment of the present invention, in the case where end line Le of the specular reflection region is set at 75 mm.
Figure 48:
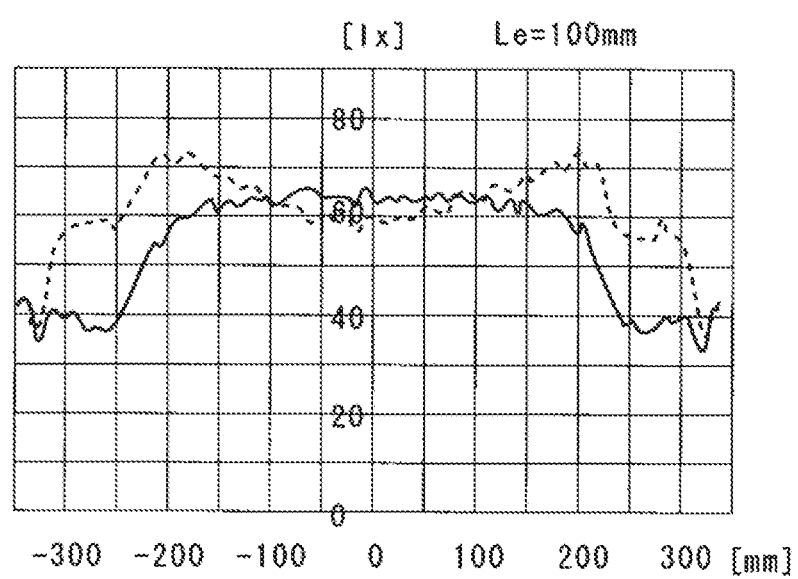
FIG. 48 is a graph for contrasting the illuminance distribution of the surface light source device according to the second embodiment and the illuminance distribution of the surface light source device according to the first embodiment of the present invention, in the case where end line Le of the specular reflection region is set at 100 mm.
Figure 49:
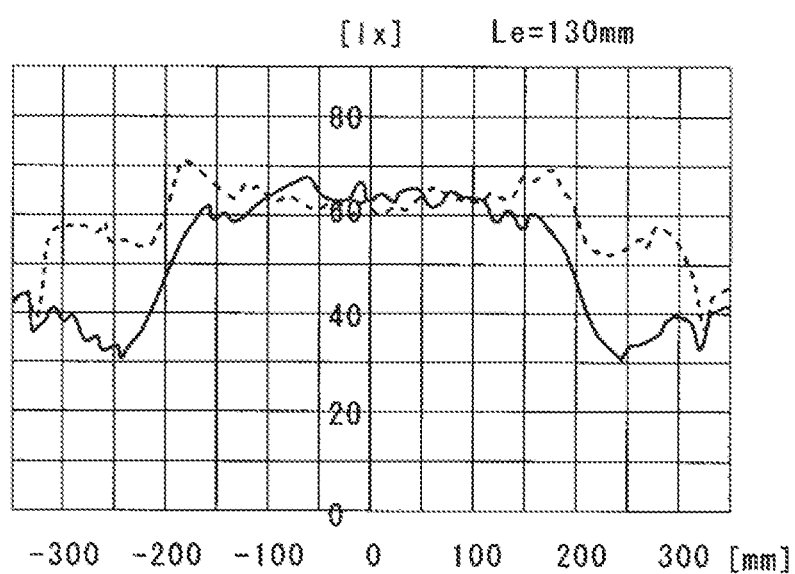
FIG. 49 is a graph for contrasting the illuminance distribution of the surface light source device according to the second embodiment and the illuminance distribution of the surface light source device according to the first embodiment of the present invention, in the case where end line Le of the specular reflection region is set at 130 mm.
Figure 50:
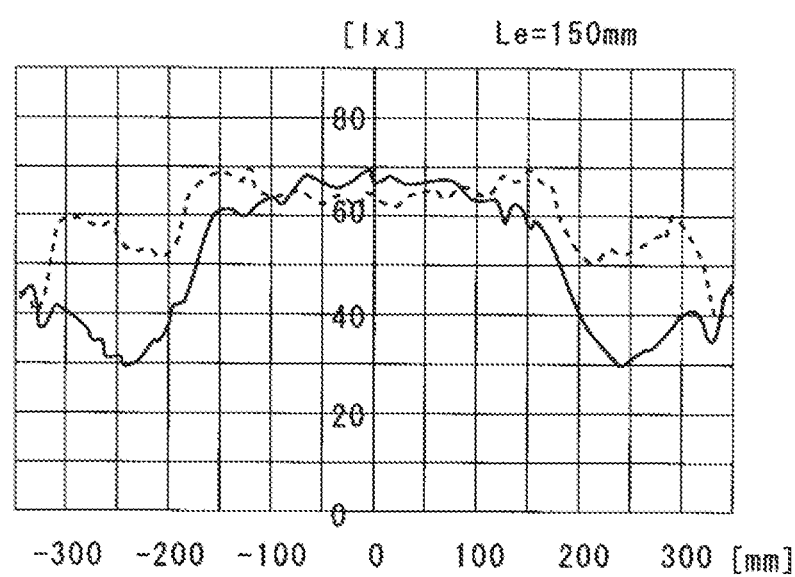
FIG. 50 is a graph for contrasting the illuminance distribution of the surface light source device according to the second embodiment and the illuminance distribution of the surface light source device according to the first embodiment of the present invention, in the case where end line Le of the specular reflection region is set at 150 mm.
Figure 51:
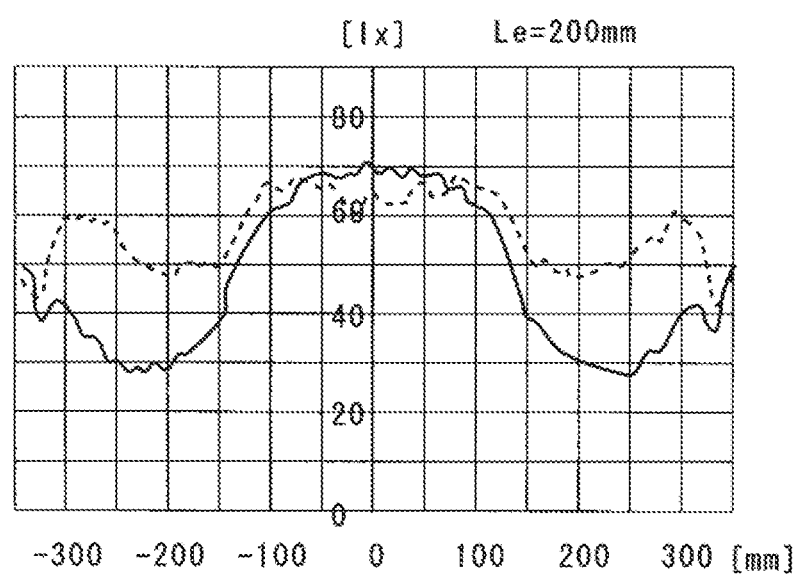
FIG. 51 is a graph for contrasting the illuminance distribution of the surface light source device according to the second embodiment and the illuminance distribution of the surface light source device according to the first embodiment of the present invention, in the case where end line Le of the specular reflection region is set at 200 mm.
Figure 52:
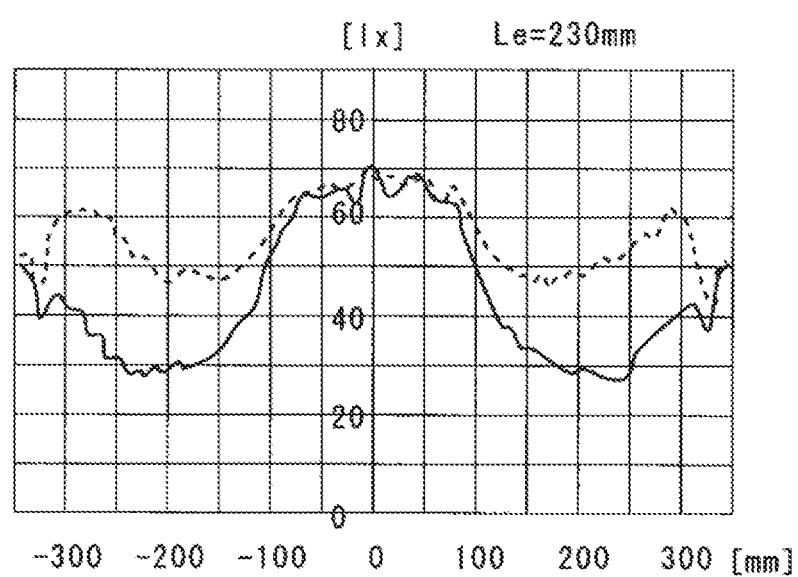
FIG. 52 is a graph for contrasting the illuminance distribution of the surface light source device according to the second embodiment and the illuminance distribution of the surface light source device according to the first embodiment of the present invention, in the case where end line Le of the specular reflection region is set at 230 mm.
Figure 53:
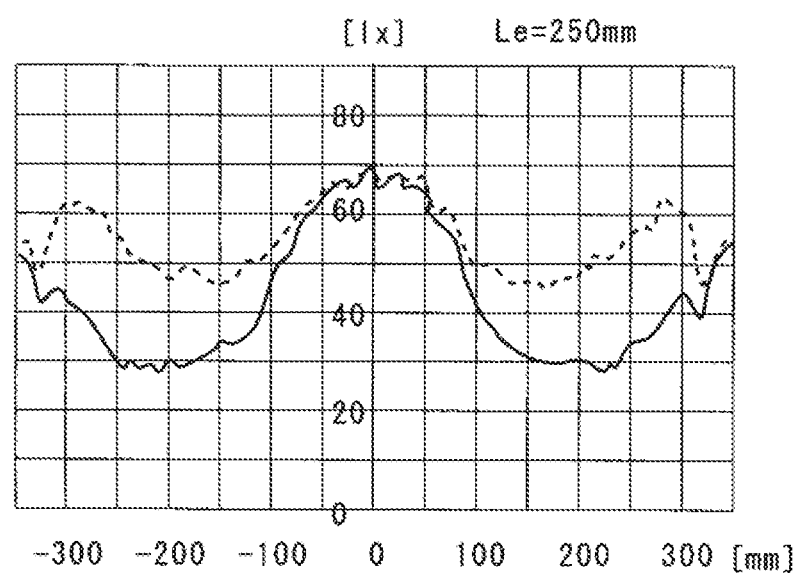
FIG. 53 is a graph for contrasting the illuminance distribution of the surface light source device according to the second embodiment and the illuminance distribution of the surface light source device according to the first embodiment of the present invention, in the case where end line Le of the specular reflection region is set at 250 mm.
Figure 54:
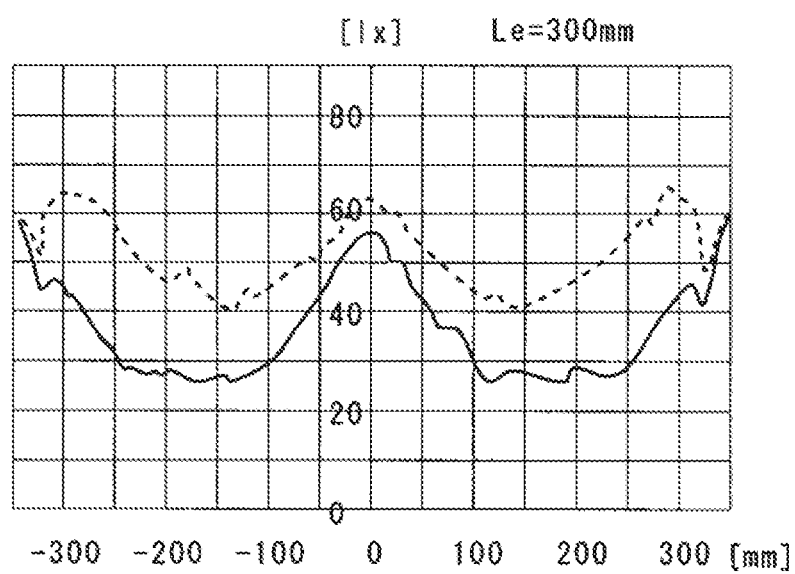
FIG. 54 is a graph for contrasting the illuminance distribution of the surface light source device according to the second embodiment and the illuminance distribution of the surface light source device according to the first embodiment of the present invention, in the case where end line Le of the specular reflection region is set at 300 mm.

It is to be noted that FIG. 45 to FIG. 54 show the illuminance distributions in respective conditions, specifically, Le=50 mm in FIG. 45, Le=70 mm in FIG. 46, Le=75 mm in FIG. 47, Le=100 mm in FIG. 48, Le=130 mm in FIG. 49, Le=150 mm in FIG. 50, Le=200 mm in FIG. 51, Le=230 mm in FIG. 52, Le=250 mm in FIG. 53, and Le=300 mm FIG. 54. In addition, in FIG. 45 to FIG. 54, the ordinate represents illuminance [lx]. In addition, in FIG. 45 to FIG. 54, the abscissa represents the distance from center O of illuminated surface 42 in the +X direction (direction along optical axis 18 of light-emitting element 16) and in the −X direction with center O of illuminated surface 42 set to 0 mm as illustrated in FIG. 5A. The abscissa shows the distance from center O of illuminated surface 42 to light emission surface 41 of light-emitting element 16 (the position of 350 mm and the position of −350 mm) at intervals of 50 mm.

In order that the bright and dark contrast of the planar illuminating light emitted from light diffusion plate 3 is not increased between the area near light-emitting devices 14 and the center portion so as to prevent degradation in illumination quality in surface light source device 1 according to the present embodiment, it is preferable that the illuminance on irradiate face 42 continuously increase from the area near light-emitting devices 14 toward the center. In view of this, referring to FIG. 45 to FIG. 54, when end line Le of specular reflection region 23 is located at 130 to 300 mm (in the case of FIG. 49 to FIG. 54), the illuminance on illuminated surface 42 at the position of ±312 mm from center O along optical axis 18 on illuminated surface 42 is approximately 40 [lx], and is not influenced by the light guiding function of prism sheet 52. However, the illuminance on illuminated surface 42 at the position of ±248 mm from center O along optical axis 18 is decreased (by approximately 10 [lx]), and thus the illuminance on illuminated surface 42 is not continuously increased from the area near light-emitting devices 14 toward center O.

Meanwhile, as illustrated in FIG. 45 to FIG. 48, when the position of end line Le of specular reflection region 23 is in the range of Le<100 mm, the illuminance on illuminated surface 42 at the position of ±248 mm from center O along optical axis 18 is equal to or greater than 40 [lx], and the illuminance on irradiate face 42 is continuously increased from the area near light-emitting devices 14 toward the center portion.

In view of the foregoing, in surface light source device 1 according to the present embodiment, the position of end line Le of specular reflection region 23 is set at 100 mm or smaller. In addition, light distribution angle θ at the position of Le=100 mm was 5.5°, where the light distribution angle θ represents an angle between optical axis 18 and light which is emitted from light emission center 16a of light-emitting element 16 and intersects with bottom surface 4 in a virtual plane which includes optical axis 18 of light-emitting element 16 and is orthogonal to bottom surface 4 of casing 2.

Given the above, in surface light source device 1 of the present embodiment, it is preferable to set end line Le of specular reflection region 23 at an intersection of light having a light distribution angle θ of 5.5° and bottom surface 4.

It is to be noted that, in the case where start line Ls is set at a position inside the intersection of light of θ≥18.5° and bottom surface 4, or where start line Ls is set at a position inside the intersection of light of θ≥30.5° and bottom surface 4, in order to achieve the effect of improving the illuminance at center O of illuminated surface 42 in comparison with the case where specular reflection region 23 is not formed, it is only necessary to set end line Le at a position inside the intersection of light of (light distribution angle θ of light which reaches the position of Ls)>θ≥2° and bottom surface 4.

In addition, it is preferable to set the length of specular reflection region 23 at 20 mm or greater also in the case where the light guiding function of the prism sheet is used in addition to the effect of specular reflection region 23 to enhance the performance of the surface light source device.

(Effect of the Present Embodiment)

Similarly to surface light source device 1 according to the first embodiment, in surface light source device 1 of the present embodiment, specular reflection region 23 of reflection member 20 disposed on bottom surface 4 of casing 2 reflects light emitted from light-emitting devices 14 in a direction away from light-emitting devices 14, whereby the illuminance in the area near light-emitting devices 14 on illuminated surface 42 can be decreased to a low level and the illuminance at center O of illuminated surface 42 can be increased. As a result, surface light source device 1 of the present embodiment can decrease the brightness of the planar illuminating light emitted from light diffusion plate 3 in the area near light-emitting devices 14 and can increase the brightness of the planar illuminating light emitted from light diffusion plate 3 at center O, and therefore, can achieve bright and uniform planar illumination by decreasing luminance unevenness of emitted light, without decreasing use efficiency of light.

In addition, as illustrated in FIG. 45 to FIG. 48, in comparison with surface light source device 1 according to the first embodiment, surface light source device 1 of the present embodiment can uniformize the illuminance on illuminated surface 42, and thus can further uniformize the luminance of the planar illuminating light emitted from light diffusion plate 3.

It is to be noted that, similarly to surface light source device 1 according to the first embodiment, surface light source device 1 according to the present embodiment can compose display 50 in which illuminated member (a liquid crystal display panel, an advertisement plate and the like) 51 is disposed in an overlapping relationship on light diffusion plate 3 of surface light source device 1, and illuminated member 51 is illuminated by the planar illuminating light emitted from light diffusion plate 3 of surface light source device 1.

Figure 55:
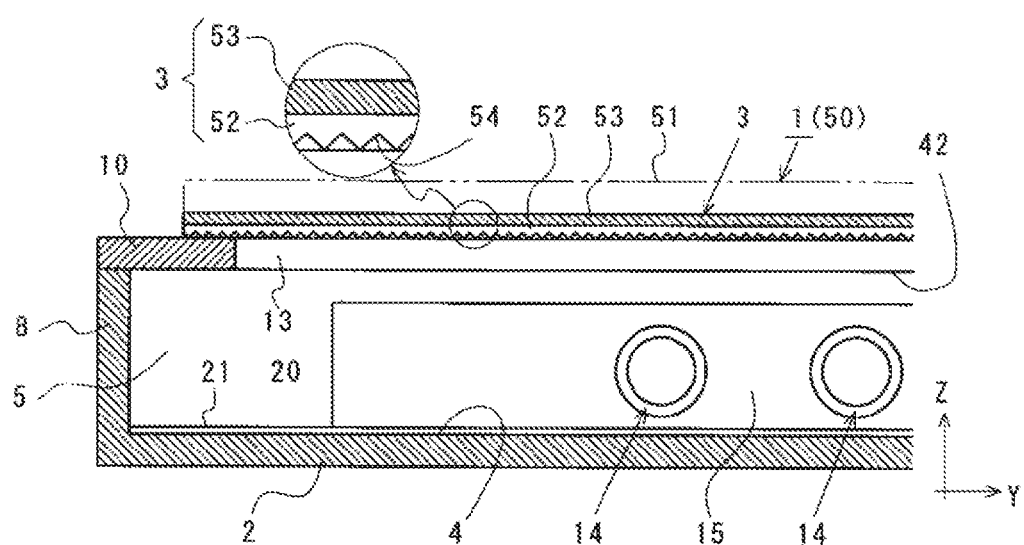
FIG. 55 illustrates a state where a prism sheet of the surface light source device according to the second embodiment of the present invention illustrated in FIG. 44 is inverted.
Figure 56:
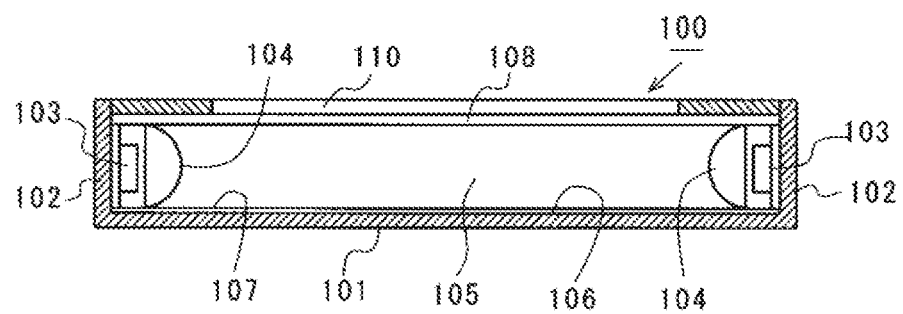
FIG. 56 is a cross-sectional view of a surface light source device according to first conventional example.
Figure 57:
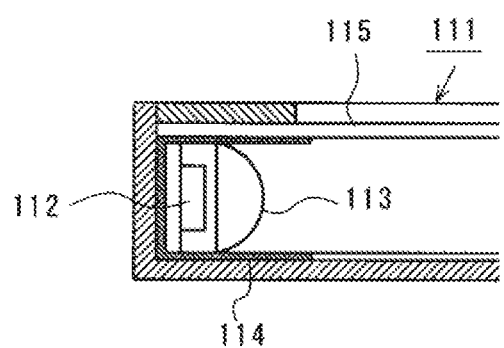
FIG. 57 is a cross-sectional view illustrating a part of a surface light source device according to second conventional example.

In addition, while prism sheet 52 is disposed with groove 54 of prism sheet 52 facing light diffusion sheet 53 in surface light source device 1 according to the present embodiment (see FIG. 44), prism sheet 52 may be inverted as illustrated in FIG. 55.

It is to be noted that, while an exemplary case where a plurality of light-emitting devices are arranged at even intervals has been described in the present embodiment, the present invention is not limited thereto. For example, similarly to conventional techniques, one light-emitting device which is composed of a combination of a plurality of light-emitting elements and one light flux controlling member (for example, cylindrical lens) may be arranged on the side wall. In this case, the light flux controlling member also has a function of suppressing the dispersion of the light in the thickness direction of the surface light source device, similarly to the light flux controlling member in the present embodiment.

In addition, while an exemplary case where a plurality of light-emitting devices are arranged on the opposite side walls so as to face each other has been described in the present embodiment, the present invention is not limited thereto. For example, one or more light-emitting devices may be arranged on only one side wall.

Further, while an exemplary case where first reflection member 21 and second reflection member 22 are arranged on the bottom surface of the casing has been described in the present embodiment, the present invention is not limited thereto. For example, it is also possible to form the casing itself by a material having a reflection function similar to that of first reflection member 21, and dispose only second reflection member 22. For example, it is also possible to form the casing itself by a material having a reflection function similar to that of second reflection member 22, and dispose only first reflection member 21.

This application is entitled to and claims the benefit of Japanese Patent Application No. 2011-215747, filed on Sep. 29, 2011, the disclosure of which including the specification, drawings and abstract is incorporated herein by reference in its entirety.

INDUSTRIAL APPLICABILITY

The surface light source device of the present invention is suitable for, for example, a backlight of a liquid crystal display, a surface illuminating device, and the like.

REFERENCE SIGNS LIST

1 Surface light source device
2 Casing
3 Light diffusion plate
4 Bottom surface
5, 6, 7, 8 Side wall
11 Internal space
13 Opening
14 Light-emitting device
16 Light-emitting element
16a Light emission center
17 Light flux controlling member
18 Optical axis
20 Reflection member
21 First reflection member (diffuse reflection region)
23 Specular reflection region
25 Emission surface
25a First emission surface
25b Second emission surface
26 Total reflection surface
27 Incident surface
30 Central axis
31 Rear surface
32 Recess
33 First incident surface
34 Second incident surface
50 Display
51 Illuminated member
52 Prism sheet
53 Light diffusion sheet
54 Groove
Ls Start line
Le End line

The invention claimed is:

1. A surface light source device comprising:
a bottom surface;
side walls;
an internal space surrounded by the bottom surface and the side walls and having an opening on a roof side opposite to the bottom surface;
light-emitting devices disposed on an internal surface of a pair of the side walls facing each other;

a reflection member disposed on the bottom surface or as the bottom surface, the reflection member being configured to reflect light emitted from the light-emitting devices; and a light diffusion plate disposed so as to cover the opening, the light diffusion plate being configured to allow the light from the light-emitting devices to pass therethrough and diffuse the light from the light-emitting devices, wherein each of the light-emitting devices includes a light-emitting element and a light flux controlling member, the light flux controlling member being disposed in a one-to-one relationship with the light-emitting element, and configured to collect light from the light-emitting element and emit the light toward the side wall opposite the light flux controlling member being on the opposite side of the surface light source device, the light-emitting element is disposed on the internal surface of the side wall in such a manner that an optical axis of the light-emitting element is orthogonal to the internal surface of the pair of the side walls and in parallel to the bottom surface when the optical axis is defined as a travelling direction of light that is in the center of three-dimensional light flux emitted from the light-emitting element, the reflection member includes a pair of specular reflection regions and a diffuse reflection region on the internal space side, the pair of the specular reflection regions are disposed near the pair of the side walls on which the light-emitting devices are disposed in such a manner that the specular reflection region reflects the light emitted from the light-emitting device in a direction away from the light-emitting device so as to prevent an increase in a brightness in an area near the light-emitting device of the surface light source device and prevent a decrease in the brightness in a central area of the surface light source device, the pair of the specular reflection regions are a belt-shaped regions extending in a direction orthogonal to the optical axis and having a predetermined width, the diffuse reflection region is disposed between the pair of the specular reflection regions, no other specular reflection region is disposed between the pair of the specular reflection regions, the light flux controlling member is disposed in such a manner that a central axis thereof matches the optical axis, the light flux controlling member including an incident surface from which the light from the light-emitting element enters the light flux controlling member, a total reflection surface that totally-reflects part of light having entered the light flux controlling member from the incident surface, so as to collect the light, and an emission surface that emits light reflected by the total reflection surface and light having directly reached thereto from the incident surface, the incident surface is an internal surface of a recess formed on a rear surface side so as to face the light-emitting element, the incident surface including a first incident surface located at a bottom of the recess, and a second incident surface located between the first incident surface and an edge of an opening of the recess, the total reflection surface is formed between the rear surface side and the emission surface side so as to surround the optical axis and totally reflect light entered mainly from the second incident surface of the incident surface toward the emission surface side, the emission surface is formed around the optical axis on an opposite side of the rear surface, the emission surface including a first emission surface disposed on the reflection member side relative to the optical axis, a second emission surface disposed on a side distant from the reflection member relative to the first emission surface, and an upright wall connecting the first emission surface and the second emission surface along the central axis, and the second emission surface is so formed that light emitted from the second emission surface has a greater light flux directed toward the reflection member side in comparison with a light distribution property of light emitted from a surface which is obtained by turning the first emission surface by 180° about the optical axis of the light-emitting element.

2. The surface light source device according to claim 1, wherein when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 18.5° or greater and the bottom surface, the end line of the specular reflection region is provided at an intersection of light having a light distribution angle θ of 2° or greater and the bottom surface, and a distance between the start line and the end line is equal to or greater than 20 mm.

3. The surface light source device according to claim 1, wherein when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle θ, the start line of the specular reflection region is provided at an intersection of light having a light distribution angle θ of 30.5° or greater and the bottom surface, the end line of the specular reflection region is provided at an intersection of light having a light distribution angle θ of 2° or greater and the bottom surface, and a distance between the start line and the end line is equal to or greater than 20 mm.

4. The surface light source device according to claim 1, wherein the light diffusion plate is a layer sequence including a prism sheet and a light diffusion sheet, the prism sheet being provided with a plurality of grooves each having a substantially triangular shape in cross-sectional view, the grooves extending along the optical axis and formed in a direction orthogonal to the optical axis, the light diffusion sheet being configured to allow light from the light-emitting device having passed through the prism sheet to pass therethrough while diffusing the light from the light-emitting device having passed through the prism sheet, in the prism sheet, inclined surfaces defining the groove reflect part of the light from the light-emitting device to thereby guide the light, and when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle $\theta$, the start line of the specular reflection region is provided at an intersection of light having a light distribution angle $\theta$ of 18.5° or greater and the bottom surface, the end line of the specular reflection region is provided at an intersection of light having a light distribution angle $\theta$ of 5.5° or greater and the bottom surface, and a distance between the start line and the end line is equal to or greater than 20 mm.

5. The surface light source device according to claim 1, wherein the light diffusion plate is a layer sequence including a prism sheet and a light diffusion sheet, the prism sheet being provided with a plurality of grooves each having a substantially triangular shape in cross-sectional view, the grooves extending along the optical axis and formed in a direction orthogonal to the optical axis, the light diffusion sheet being configured to allow light from the light-emitting device having passed through the prism sheet to pass therethrough while diffusing the light from the light-emitting device having passed through the prism sheet, in the prism sheet, inclined surfaces defining the groove reflect part of the light from the light-emitting device to thereby guide the light, and when an edge of the specular reflection region located at a position near the light-emitting element is defined as a start line whereas an edge of the specular reflection region located at a position distant from the light-emitting element relative to the start line is defined as an end line, and an angle between the optical axis and a travelling direction of light emitted from a light emission center of the light-emitting element in a virtual plane which includes the optical axis and is orthogonal to the pair of the side walls and the bottom surface is defined as a light distribution angle $\theta$, the start line of the specular reflection region is provided at an intersection of light having a light distribution angle $\theta$ of 30.5° or greater and the bottom surface, the end line of the specular reflection region is provided at an intersection of light having a light distribution angle $\theta$ of 5.5° or greater and the bottom surface, and a distance between the start line and the end line is equal to or greater than 20 mm.

6. A display comprising:

the surface light source device according to claim 1; and an illuminated member to be illuminated by planar illuminating light emitted from the surface light source device.

* * * * *